(12) United States Patent
Itai

(10) Patent No.: US 11,330,116 B2
(45) Date of Patent: May 10, 2022

(54) IMAGE FORMING DEVICE AND PROPOSAL PROCESSING PREDICTION METHOD FOR IMAGE FORMING DEVICE

(71) Applicant: SHARP KABUSHIKI KAISHA, Osaka (JP)

(72) Inventor: Tsutomu Itai, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/141,856

(22) Filed: Jan. 5, 2021

(65) Prior Publication Data

US 2021/0218852 A1 Jul. 15, 2021

(30) Foreign Application Priority Data

Jan. 15, 2020 (JP) .............................. JP2020-004453

(51) Int. Cl.
*H04N 1/00* (2006.01)

(52) U.S. Cl.
CPC ..... *H04N 1/00076* (2013.01); *H04N 1/00005* (2013.01); *H04N 1/00037* (2013.01); *H04N 1/00408* (2013.01)

(58) Field of Classification Search
None
See application file for complete search history.

(56) References Cited

U.S. PATENT DOCUMENTS

| 4,929,844 | A | * | 5/1990 | Houjiyou | ........... H04N 1/00681 250/559.07 |
| 2006/0245006 | A1 | * | 11/2006 | Nakata | ................. H04N 1/0035 358/448 |
| 2016/0378413 | A1 | * | 12/2016 | Enokizono | ............ G06F 3/1285 358/1.16 |

FOREIGN PATENT DOCUMENTS

JP 2006-309673 A 11/2006

* cited by examiner

*Primary Examiner* — Frantz Bataille
(74) *Attorney, Agent, or Firm* — ScienBiziP, P.C.

(57) ABSTRACT

An image forming device includes a document information acquirer that acquires information related to a document, a sheet information acquirer that acquires information related to a print sheet, a storage that stores, in advance, information related to the document and the print sheet, and prediction condition information including proposal processing associated with the document and the print sheet, a processing predictor that acquires, based on the information related to the document and the information related to the print sheet acquired by using the prediction condition information, proposal processing associated with the placed document and the print sheet, and a proposal processing generator that generates information related to the proposal processing to be presented to a user based on the acquired proposal processing. When the user places a document and a print sheet, the proposal processing is acquired and presented to the user.

7 Claims, 15 Drawing Sheets

FIG. 2

PREDICTION CONDITION INFORMATION 53

| No. | DOCUMENT — DOCUMENT TABLE PRESENCE | DOCUMENT TABLE ABSENCE | ADF PRESENCE | ADF ABSENCE | DOCUMENT SIZE | NUMBER OF SHEETS OF DOCUMENT | PRINT SHEET (MANUAL FEED TRAY) — SHEET PRESENCE | SHEET ABSENCE | SHEET TYPE INPUT (ENVELOPE, OHP, INDEX) | PROPOSAL PROCESSING |
|---|---|---|---|---|---|---|---|---|---|---|
| A1 | O | – | – | – | BUSINESS CARD | 1 | – | O | | BUSINESS CARD SCAN |
| A2 | O | – | – | – | CARD | 1 | – | O | | CARD SCAN |
| A3 | O | – | – | – | A4 | 1 | – | O | | DOCUMENT SCAN, COPY (SCAN, COPY SELECTION DISPLAY) |
| A4 | – | – | O | – | A3 | 1 | – | O | | DOCUMENT SCAN, COPY (SCAN, COPY SELECTION DISPLAY) |
| A5 | O | – | – | – | BUSINESS CARD | 2 OR MORE | – | O | | MULTI-SCAN |
| A6 | – | – | O | – | A4, A3 | 2 OR MORE | – | O | | MIXED SCAN |
| B1 | – | – | – | – | – | – | O | – | OHP | OHP FILM SYNTHETIC COPY |
| B2 | – | – | – | – | – | – | O | – | INDEX | INDEX COPY |
| C1 | O | – | – | – | BUSINESS CARD | 1 | O | – | PLAIN PAPER | BUSINESS CARD COPY |
| C2 | O | – | – | – | ENVELOPE | 1 | O | – | ENVELOPE | BASE REMOVAL COPY (RANGE IDENTIFICATION REMOVAL) |
| C3 | O | – | – | – | A4 | 1 | O | – | A4 | RECYCLED PAPER COPY (RECYCLED PAPER EXISTS ON OTHER TRAY) |
| C4 | O | – | – | – | A4 | 1 | O | – | A3 | ENLARGED COPY |
| C5 | – | – | O | – | A4 | 2 OR MORE | O | – | A3 | 2IN1 COPY (DOCUMENT READ SIZE ADJUSTMENT) |

IMAGE FORMING DEVICE AND PROPOSAL PROCESSING PREDICTION METHOD FOR IMAGE FORMING DEVICE

BACKGROUND OF THE INVENTION

Field of the Invention

The present invention relates to an image forming device, and more particularly, to an image forming device having a function of presenting information corresponding to a document or a print sheet placed on a document table or the like to a user.

Description of the Background Art

Conventionally, an image forming device having a function of detecting the size of a document placed on a document table has been used. After the image forming device reads a document, the image forming device prints image data of the read document on a print sheet having the same size as the size of the detected document, for example.

Even an image forming device equipped with an automatic document feeder automatically detects the size of a document when reading the document placed in the automatic document feeder, and prints image data of the read document on a print sheet having the same size.

In such an image forming device, the user can omit the input for setting the size of the document.

Further, Japanese Patent Application Laid-Open No. 2006-309673 describes an image processing device, which stores job history information indicating, for each user and each job executed by the users in the past, the processing contents (user ID, job type, file name, number of copies, and the like) of the executed jobs, predicts the processing content of the next job that a user is expected to execute next in accordance with the processing content of the job executed based on the user's instruction and the job history information, and displays a screen in which the predicted processing content for the next job is set, thereby being able to reduce the input operation for the processing content that will be performed next.

However, in recent image forming devices, there is an image forming device which has a plurality of functions such as a document reading function, a document editing function, and a document transmitting function, in addition to a printing function. Therefore, even if it is possible to omit a user from entering to set the size of a document, it is necessary for the user herself or himself to perform an input operation to select the function that the user desires to use, so as to use any function of the plurality of functions.

Further, in case of displaying a screen in which the predicted processing content of the next job is set, the display screen based on the prediction uses the job history information executed by the user in the past. Therefore, if the user next intends to execute a job, which is different from the preciously executed jobs, the display screen based on the prediction may not be useful.

In case of predicting the next job using the job history information, the next job is predicted mainly by using the order of the jobs executed in the past. However, when the user is unlikely to execute the next job in the same order as in the past, or when the frequency that a specific user uses an image forming device installed in a convenience store or the like and used by an unspecified number of users is low, displaying the predicted processing content of the next job is often not useful for the user.

Furthermore, when the predicted content on the display screen is not used by the user, for example, the user may have to delete the display screen based on the prediction, and perform an input operation to display a screen related to the next job that the user intends to perform. In this way, in case of executing a job which does not exist in the past history, it may take time to execute the job, and the burden on the user's input operation may be large.

By the way, when the user uses the image forming device, the user may perform a fixed operation to some extent for each function to be used, such as an operation of placing a document to be printed or the like, an operation to place a desired special print sheet, an operation to select a specific print sheet, and an operation to select the function to be executed.

Accordingly, the present invention has been made in view of the above-described circumstances, and has an object to provide an image forming device, which can detect an operation performed by a user such as an operation of placing a document in the image forming device, shorten the time period required to execute the function intended by the user, and reduce the operational burden on the user.

SUMMARY OF THE INVENTION

The present invention provides an image forming device, that includes a document information acquirer that acquires information related to a document placed at a predetermined document placement position, a sheet information acquirer that acquires information related to a print sheet placed at a predetermined position, a storage that stores, in advance, information related to the document, information related to the print sheet, and prediction condition information including proposal processing associated with a document and a print sheet, a processing predictor that predicts a function to be executed by a user based on information related to the document and information related to the print sheet, which are acquired, by using the prediction condition information, and acquires proposal processing associated with the document and the print sheet, which are placed, and a proposal processing generator that generates information related to proposal processing to be presented to a user based on the obtained proposal processing, when a user places a document and a print sheet, the processing predictor acquires proposal processing associated in advance with the placed document and the print sheet, and the proposal processing generator generates information related to the obtained proposal processing, and presents proposal processing to a user.

Also, the present invention provides an image forming device, that includes a document information acquirer that acquires information related to a document placed at a predetermined document placement position, a storage that stores, in advance, information related to the document, and prediction condition information including proposal processing associated with a document, a processing predictor that predicts a function to be executed by a user based on information related to the document, which is acquired, by using the prediction condition information, and acquires proposal processing associated with the document, which is placed, and a proposal processing generator that generates information related to proposal processing to be presented to a user based on the obtained proposal processing, when a user places a document, the processing predictor acquires proposal processing associated in advance with the placed document, and the proposal processing generator generates information related to the obtained proposal processing, and presents proposal processing to a user.

Also, the present invention provides an image forming device, that includes a sheet information acquirer that acquires information related to a print sheet placed at a predetermined position, a storage that stores, in advance, information related to the print sheet, and prediction condition information including proposal processing associated with a print sheet, a processing predictor that predicts a function to be executed by a user based on information related to the print sheet, which is acquired, by using the prediction condition information, and acquires proposal processing associated with the print sheet, which is placed, and a proposal processing generator that generates information related to proposal processing to be presented to a user from the obtained proposal processing, when a user places a print sheet, the processing predictor acquires proposal processing associated in advance with the placed print sheet, and the proposal processing generator generates information related to the obtained proposal processing, and presents proposal processing to a user.

The image forming further includes a display, and proposal processing is presented to a user by displaying information related to the generated proposal processing on the display.

Further, the document placement position is a position at which a document is placed on a document table or in an automatic document feeder, and information related to a document acquired by the document information acquirer includes the presence or absence of a document placed on the document table or in the automatic document feeder, and a document size.

Further, a position where the print sheet is placed is a manual feed tray, and information related to a print sheet acquired by the sheet information acquirer includes the presence or absence of a print sheet placed on the manual feed tray and a sheet type.

Further, the prediction condition information stores, in advance, information related to a document, which includes the presence or absence of a document placed on a document table, the presence or absence of a document placed in an automatic document feeder, and a size of a document to be placed, information related to a print sheet, which includes the presence or absence of a print sheet placed on a manual feed tray and a sheet type of a print sheet, and a plurality of prediction information associated with proposal processing that is predicted to be executed by a user.

Further, the image forming device further includes an operator, and a function executor that executes the presented proposal processing, when the operator receives an input for approving as a function for next executing the presented proposal processing, and the function executor causes the presented proposal processing to be performed.

Also, the present invention provides a proposal processing prediction method for an image forming device, which includes acquiring information related to a document placed at a predetermined document placement position as acquisition of document information, acquiring information related to a print sheet placed at a predetermined position as acquisition of sheet information, predicting a function that an user intends to execute, based on information related to the document, and information related to the print sheet, which are acquired, using information related to the document, information related to the print sheet, and prediction condition information including proposal processing associated with a document and a print sheet, thereby acquiring proposal processing associated with the document and the print sheet, which are placed, as a prediction of processing, generating, based on the acquired proposal processing, information related to proposal processing to be presented to a user, as generation of proposal processing, and displaying information related to the generated proposal processing, when a user places a document and a print sheet, the proposal processing is presented to a user as a function that a user intends to execute before a user executes a desired function.

Effects of the Invention

According to the present invention, when a user arranges a document and a print sheet, the processing predictor acquires the proposal processing associated in advance with the placed document and the placed print sheet, and the proposal processing generator generates information related to the acquired proposal processing and presents the proposal processing to the user. Therefore, the present invention can detect an arrangement operation of a document or a print sheet performed by a user in an image forming device, shorten a time period required to execute the function intended by the user, and reduce an operational burden on the user.

BRIEF DESCRIPTION OF THE DRAWINGS

FIG. 2 is an explanatory diagram of an embodiment of prediction condition information stored in a storage in the image forming device according to the present invention.

DESCRIPTION OF THE PREFERRED EMBODIMENTS

Hereinafter, embodiments according to the present invention will be described with reference to the drawings. Note that the present invention is not limited by the description of the following embodiments.

Figure 1:
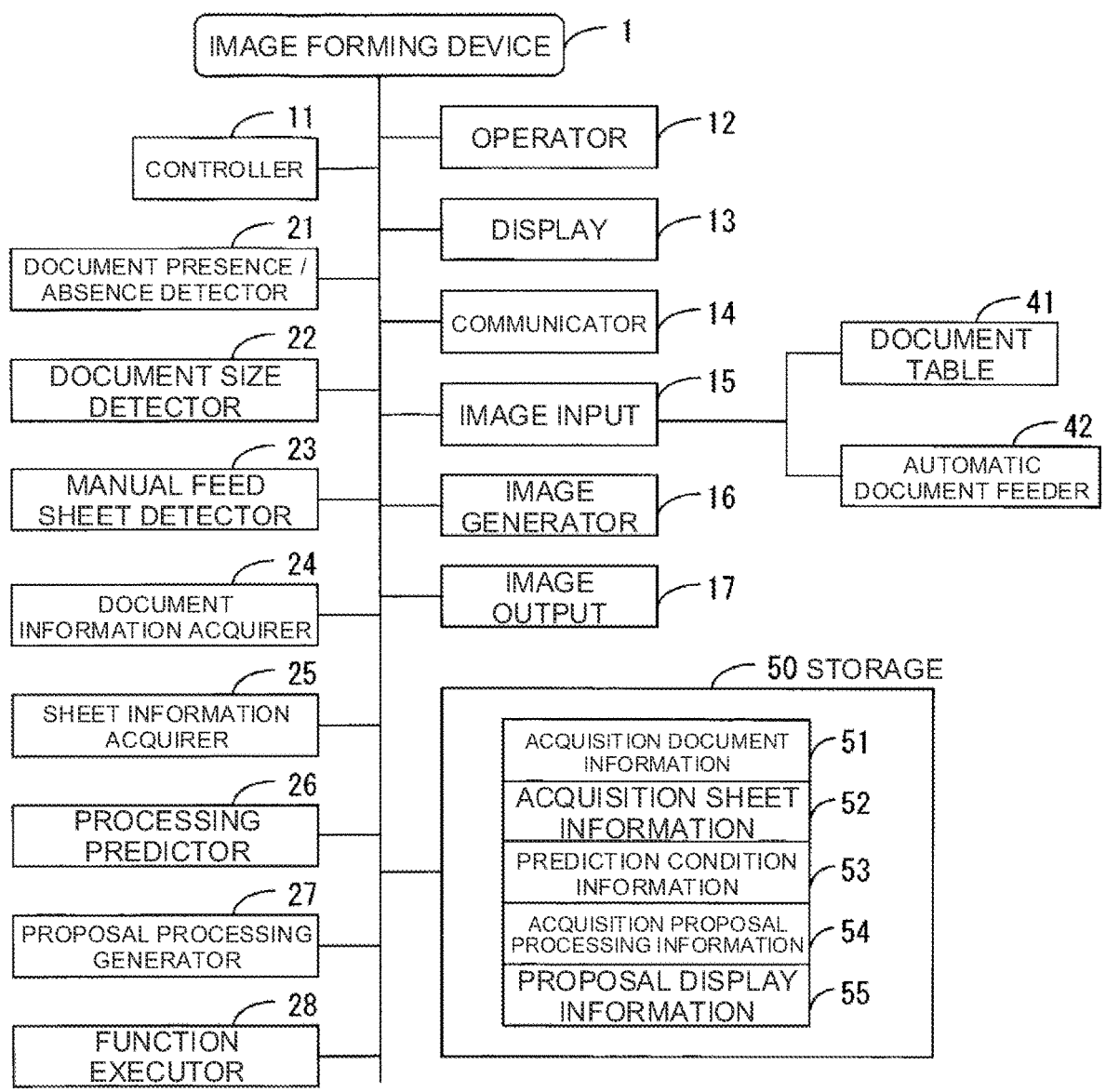
FIG. 1 is a block diagram of an embodiment of an image forming device according to the present invention.

Further, although the present invention is an image forming device described below, the present invention is also applicable to other information processing device, image processing device, or the like, having a function of reading a document placed on a document table or the like.
Configuration of Image Forming Device FIG. 1 illustrates a block diagram of an embodiment of an image forming device according to the present invention.

An image forming device (hereinafter, also referred to as a multifunction peripheral (MFP)) 1 is a device for processing image data. The image forming device 1 is an electronic device having, for example, a copying function, a printing function, a document reading (scanning) function, a document editing function, a document transmission (facsimile, FAX) function, a communication function, and the like.

In the following embodiments, although the image forming device 1 according to the present invention is described as an image forming device specifically having the copying function and the document reading (scanning) function, the image forming device 1 according to the present invention may have a function other than the functions.

The image forming device 1 of the present invention includes a document table 41 on which a document to be read is placed, and a document cover for suppressing the document.

Further, the image forming device 1 has a function of detecting that a document is placed on the document table 41 (document presence/absence detection function).

Furthermore, the image forming device 1 preferably has a function of detecting the size of the document placed on the document table 41 (document size detection function).

However, the image forming device 1 does not necessarily have to have the function of detecting the size of the document placed on the document table 41. When the image forming device 1 does not have the function of detecting the size of the document, the image forming device 1 has a function for a user to input the size of the document placed on the document table 41.

Further, the image forming device 1 may include an automatic document feeder 42 (hereinafter, also referred to as ADF) for arranging a plurality of documents, and automatically conveying and reading the plurality of documents one by one.

The automatic document feeder 42 may be a device that reads only one side of a document. Further, the automatic document feeder 42 may be a device (reverse automatic document feeder (RADF)) that reads both sides of a document.

Furthermore, the automatic document feeder 42 has a function of detecting the size of each of a plurality of documents placed in the ADF 42 when the plurality of documents are arranged.

Also, the image forming device 1 includes a sheet cassette for storing a print sheet in advance, and a manual feed tray for placing a print sheet.

The image forming device 1 has a function of detecting that a print sheet is placed on the manual feed tray (sheet presence/absence detection function), and a function of detecting the size of a print sheet placed on the manual feed tray (sheet size detection function).

In FIG. 1, the image forming device (MFP) 1 according to the present invention mainly includes a controller 11, an operator 12, a display 13, a communicator 14, an image input 15, an image generator 16, an image output 17, a document presence/absence detector 21, a document size detector 22, a manual feed sheet detector 23, a document information acquirer 24, a sheet information acquirer 25, a processing predictor 26, a proposal processing generator 27, a function executor 28, and a storage 50.

The document presence/absence detector 21 detects whether a document is placed on the document table 41. When the document size detector 22 includes the automatic document feeder 42, the document size detector 22 detects the size of a document placed in the automatic document feeder 42.

The controller 11 is a part that controls the operation of each component such as the operator 12 and the image generator 16. The controller 11 is mainly realized by a microcomputer including a central computing unit (CPU), a read only memory (ROM), a random access memory (RAM), an input and output (I/O) controller, a timer, and the like.

The CPU organically operates each hardware based on a control program stored in advance in the ROM or the like to execute an image forming function, a document size detection function, a proposal processing generation function, and the like of the present invention.

Further, among the above components, the document information acquirer 24, the sheet information acquirer 25, the processing predictor 26, and the proposal processing generator 27 are functional blocks for the CPU to execute the respective processing on the basis of a predetermined program.

The operator 12 is an input device for a user of the image forming device 1 to perform a predetermined input operation.

For example, the operator 12 is a part for inputting information such as a character and selectively inputting a function, and is configured by a keyboard, a mouse, a touch panel, and the like.

The keys operated by the user include an item selection key, an operation start key, a function selection key, and a setting key.

The display 13 is a part for displaying information, and displays information necessary for executing each function, the result of the executed function, and the like, in order to inform the user of the information. For example, a liquid crystal display (LCD), an organic electro luminescence (EL) display, or the like is used for the display 13. When a touch panel is used as the operator 12, the display 13 and the touch panel are arranged so as to overlap each other.

The display 13 displays, for example, setting of a setting item used for printing by the image forming device 1, information necessary for executing the document reading function and the like, an operation screen of the selected function, a function proposal screen, and the like by using a character, a symbol, a drawing, an image, an icon, an animation, a video, and the like.

The communicator 14 is a part that performs data communication with another communication device via a network. For example, the communicator 14 receives an electronic data file transferred from an information processing device such as a personal computer, a mobile terminal, and a server.

Further, the communicator 14 transfers image data generated by the image forming device 1 of the present invention to an external storage device (USB memory or the like) connected to the image forming device 1, and transmits the image data to an information processing device such as a server via the network.

For the network, any existing communication network, for example, a wide area communication network such as the Internet, a local area network (LAN), or the like may be used. Either wired communication or wireless communication may be used for the communication.

Furthermore, an information processing device such as a server may create prediction condition information, which will be described later. Then, the communicator 14 may receive the prediction condition information created by the information processing device, and the storage 50 may store the prediction condition information.

The image input 15, the image generator 16, and the image output 17 correspond to an image processor that executes the image forming function of the image forming device 1 itself.

Mainly, the image input 15 is a part for inputting predetermined image data. The image generator 16 is a part that converts the input image data into information that can be printed or the like. The image output 17 is a part that outputs the produced print information or the like to a print sheet or the like.

The image input 15 is a part that inputs information such as a document in which an image, a character diagram, or the like is described. Further, the image input 15 is a part that reads a document placed on the document table 41 or in the ADF 42.

The image input 15 uses a scanner (reading device) that reads a document in which information is written.

There are various methods for inputting image information. For example, the image input 15 reads a document on which an image or the like is written by the scanner, and stores the image data of the document in the storage 50.

For example, an interface for connecting an external storage medium, such as a USB memory, corresponds to the image input 15.

An electronic data file such as image information that is desired to be input may be stored in an external storage medium such as a USB memory, and a desired electronic data file stored in the USB memory or the like may be read out by connecting the USB memory or the like to the input interface such as a USB terminal and performing a predetermined input operation on the operator 12. As a result, the desired electronic data file may be stored in the storage 50 as image data.

For example, when printing image data on a recording medium (print sheet), the image generator 16 generally continuously performs each step of charging, exposure, development, transfer, cleaning, static elimination, and fixing to form the image data on the recording medium.

In the developing step, toner is supplied from a toner cartridge to a developing device, an electrostatic latent image formed on the surface of the charged photosensitive drum is developed, and a toner image corresponding to the electrostatic latent image is formed.

The toner image formed on the surface of the photosensitive drum is transferred onto the recording medium by the transfer device, and then, fixed on the recording medium by being heated by the fixing device.

The image generator 16 converts the input image data into information in a form capable of being transferred and displayed.

The image output 17 is a part that outputs the generated image data. The image output 17 corresponds to, for example, a printer, and prints image data of a document, which has been read, on a predetermined print sheet (paper medium).

Note that the image data may be output not only by printing but also by storing the image data of the scanned document, faxing the image data of the scanned document, or the like.

For example, storing the image data of the scanned document in an external storage medium such as a USB memory or sending image data to another information processing device or server via a network such as the Internet corresponds to the image output.

The document presence/absence detector 21 is a part that detects whether a document is placed on the document table 41, and mainly includes a light-emitter and a light-receiver.

Further, when the automatic document feeder 42 is provided, the document presence/absence detector 21 is also a part that detects whether there is a document at the document placement position of the ADF 42.

The document table 41 is a table on which a document is placed, and has a document placement area in which a document is placed. The document placement area, which is made of a transparent glass plate, for example, is provided on the upper surface of the document table 41, and a document sheet is placed on the document placement area.

Further, a document cover, which is a member that presses the document sheet arranged on the document placement area from above, is connected and attached to the document table 41, so as to be openable and closable.

The document placement area is covered with the document cover by completely closing the document cover.

A light-emitting diode (LED) is used for the light-emitter, for example. The light-emitter is attached to the document cover that is openable and closable with respect to the document table 41 so that the light emitted from the light emitting diode is directed toward the document placement area.

The light-receiver is a light receiving element that receives the light emitted from the light-emitter. The light-receiver is configured by, for example, a photodiode (PD) capable of receiving visible light having a predetermined wavelength. The light-receiver is disposed on the inner side surface of the document table 41 below the document placement area. That is, the light-emitter and the light-receiver are disposed on the opposite sides of the document placement area with the document table 41 in between.

When the document cover is closed, the light beam emitted from the light-emitter passes through a transparent document placement area, and is received by the light-receiver. When the light beam emitted from the light-emitter is received by the light-receiver, it is determined that no document has been placed.

On the other hand, when a document is placed on the document table 41, the light beam emitted from the light-emitter is blocked by the document, and is not received by the light-receiver. Therefore, when the light beam emitted from the light-emitter is not received by the light-receiver, it is determined that a document has been placed.

The document size detector 22 is a part that detects, when a document is placed in the automatic document feeder 42, the size of the placed document. The detected size of the document is stored as one of acquisition document information.

When a document is placed in the automatic document feeder 42, the document size detector 22 detects the size of the document, and also detects that the document has been placed. When no document is placed in the automatic document feeder 42, the document size detector 22 detects that no document has been placed.

Conventionally, the automatic document feeder 42 has a mechanism for detecting the presence or absence of the arrangement of a document, and a mechanism for detecting the size of the placed document. Therefore, the present invention may utilize the mechanism to detect the size of a document.

Further, when the document table 41 has a mechanism for detecting the size of a document placed on the document table 41, the document size detector 22 can detect the size of the document placed on the document table 41.

For example, a plurality of detection members each having the light-emitter and the light receiver as described above are arranged, and the document size detector 22 confirms the position where the light emitted from each light-emitter is received by each-light receiver, and the position where the light emitted from each light-emitter is not received by each-light receiver. Therefore, the document size detector 22 can detect the size of the document.

The manual feed sheet detector 23 is a part that detects that a print sheet is placed on the manual feed tray.

The manual feed sheet detector 23 is, for example, a push button switch.

In a state in which a print sheet is placed on the manual feed tray, when the push button switch is pressed, it is determined that there is a print sheet on the manual feed tray. On the other hand, in the state, when the push button switch is not pressed, it is determined that there is no print sheet on the manual feed tray.

The push button switch may be installed to the vicinity of an entrance where a print sheet is taken into the inside of the image forming device 1 in an area where the print sheet is placed in the manual feed tray.

Further, as the manual feed sheet detector 23, an optical sensor in which the light-emitter that emits light and the light-receiver that receives the light are placed adjacent to each other may be provided near the entrance at a position where the light is reflected by the print sheet. When the light-receiver has not received the light, it is determined that there is no print sheet on the manual feed tray. On the other hand, when the light-receiver receives the light, it is determined that there is a print sheet on the manual feed tray.

The document information acquirer 24 is a part that acquires information related to a document placed at a predetermined document placement position such as the document table 41.

The document related information is acquired by using the document presence/absence detector 21 and the document size detector 22 described above. However, the document related information may be acquired by a user input operation using the operator.

The acquired information is stored in the storage 50 as acquisition document information 51.

The document placement position is, for example, the position at which a document is placed on the document table 41 or in the automatic document feeder 42.

The document related information to be acquired includes, for example, the presence or absence of a document placed on the document table 41 or in the automatic document feeder 42, the position where the document is placed, the size of the document, the number of sheets of the document, and the like.

The acquisition document information 51 is compared with prediction condition information 53 described later, and is used to predict the function that the user intends to execute and to find out the proposal processing set in advance in the prediction condition information 53.

In the following embodiments, the document information acquirer 24 acquires, as the acquisition document information 51, the presence or absence of a document, the position of the document, the size of the document, and the number of sheets of the document.

However, the acquisition document information 51 is not limited to these information, and other information effective for finding the proposal processing may be acquired.

For example, as the acquisition document information 51, information for identifying the type of a document may be acquired, such as a document only including a photograph, a character, and a symbol, a document including a character and a photograph, a black-and-white document, a color document, and the like.

The sheet information acquirer 25 is a part that acquires information related to a print sheet placed at a predetermined position.

The predetermined position for disposing a print sheet is, for example, the position of a manual feed tray, a sheet tray, or the like. In the following embodiments, information related to a print sheet placed on the manual feed tray is acquired, in particular.

The print sheet related information is acquired by using the manual feed sheet detector 23 described above. However, the sheet type and the like of a print sheet described later may be acquired by a user input operation using the operator.

The acquired information is stored as acquisition sheet information 52 in the storage 50.

The acquired print sheet related information includes, for example, the presence or absence of a print sheet placed on the manual feed tray, the sheet type of the print sheet, the sheet size of the print sheet, and the like.

The acquisition sheet information 52 is also compared with the prediction condition information 53, and is used to predict the function that the user intends to execute, and to find out the proposal processing set in advance in the prediction condition information 53.

In the following embodiments, the sheet information acquirer 25 acquires the presence or absence of a sheet and the sheet type as the acquisition sheet information 52.

Here, the presence or absence of a sheet means the presence or absence of a sheet on the manual feed tray detected by the manual feed sheet detector 23. Further, the sheet type is identified by using the sheet type information input by the user from the operator 12.

The information input as the sheet type is, for example, an OHP, recycled paper, an index sheet, an envelope, a label sheet, a colored sheet, a glossy sheet, a thick sheet, a postcard, a clear file, a printed sheet, a letterhead sheet, a punched sheet, a thin sheet, and the like, in addition to plain paper.

However, the acquisition sheet information 52 is not limited to these information, and may be other information effective for finding the proposal processing.

The processing predictor 26 is a part that predicts the function that the user intends to execute from the acquired document and print sheet related information by using the prediction condition information 53 described later, and that confirms whether there is processing that can be presented to the user.

When there is processing that can be presented to the user, the processing predictor 26 acquires the proposal processing associated with the document and the print sheet, which are placed.

However, when the processing predictor 26 uses only the document related information in order to predict the processing content to be presented to the user, the processing predictor 26 predicts the function that the user intends to execute from the document related information acquired by using the prediction condition information 53 including the document related information and the proposal processing associated with the document. Further, the processing predictor 26 acquires the proposal processing associated with the placed document when there is processing that can be presented to the user.

Alternatively, when the processing predictor 26 uses only the print sheet related information in order to predict the processing content to be presented to the user, the processing predictor 26 predicts the function that the user intends to execute from the print sheet related information acquired by using the prediction condition information 53 including the print sheet related information and the proposal processing associated with the print sheet. Further, the processing predictor 26 acquires the proposal processing associated with the placed print sheet when there is processing that can be presented to the user.

More specifically, a plurality of proposal processing associated with the combination of the document and print sheet related information is stored in advance, for example, in the prediction condition information 53 illustrated in FIG. 2 described later. Therefore, the processing predictor 26 checks, using the acquired document related information and print sheet related information, whether there is proposal processing applicable to the acquired document and print sheet related information in the prediction condition information 53.

When there is applicable proposal processing, the processing predictor 26 acquires the information related to the proposal processing, and presents the user with the item content of the function predicted to be executed by the user.

The acquired information related to the proposal processing is stored as acquisition proposal processing information 54. An embodiment of the method for predicting the proposal processing will be described later.

The proposal processing generator 27 is a part that generates information related to the proposal processing to be presented to the user based on the acquired proposal processing when the proposal processing is acquired by the processing predictor 26.

The information related to the proposal processing generated by the proposal processing generator 27 may be displayed on the display 13, for example, and the acquired proposal processing may be presented to the user.

In this case, the generated information related to the proposal processing is information (proposal display information) that can be displayed on the display 13.

The generated information is stored as proposal display information 55.

The content of the proposal processing to be displayed may be displayed in a form in which the user can sufficiently understand the content of the proposal processing, such as a character, a symbol, a figure, and an icon.

Further, the method of presenting the proposal processing to the user is not limited to the method of displaying, and may be, for example, a method of notifying the user by voice.

The present invention acquires the proposal processing as described above when a user places a document and a print sheet, generates information related to the acquired proposal processing, and presents the proposal processing to the user as the function that the user intends to execute before the user executes the desired function.

Further, even if the user places only a document or only a print sheet, similarly, the present invention presents the proposal processing to the user as the function that the user intends to execute before the user executes the desired function.

The function executor 28 is a part that executes the function selected by the user, and, for example, is a part that executes the proposal processing presented to the user.

When the user inputs from the operator to approve the presented proposal processing as the function to be executed next, the function executor 28 executes the presented proposal processing.

Further, when the user confirms the function selection screen displayed on the display 13, and selects a desired function from a plurality of functions, which are displayed and executable, by the user performing a predetermined selection input operation, the function executor 28 executes the selected function.

Alternatively, when the user selects the function, the function executor 28 may display the operation screen including setting information and the like corresponding to the function before the function executor 28 executes the function.

The storage 50 is a part that stores information and programs necessary for executing each function of the image forming device 1 of the present invention. The storage 50 is configured by a semiconductor storage element such as a ROM, a RAM, and a flash memory, a storage device such as an HDD and an SSD, and other storage media.

The storage 50 stores, for example, the acquisition document information 51, the acquisition sheet information 52, the prediction condition information 53, the acquisition proposal processing information 54, the proposal display information 55, and the like.

As described above, the acquisition document information 51 is information acquired by the document information acquirer 24, and, for example, includes information such as the presence or absence of a document, the position of the document, the size of the document, and the number of sheets of the document.

The acquisition sheet information 52 is information acquired by the sheet information acquirer 25, and, for example, includes information regarding the presence or absence of a sheet and the type of the sheet.

The prediction condition information 53 is information related to a document, information related to a print sheet, and information including the proposal processing associated with the document and the print sheet, and information that is used to predict a processing content to be presented to the user.

The document related information includes, for example, the presence or absence of a document placed on the document table 41, the presence or absence of a document placed in the automatic document feeder 42, the size of the placed document, and the number of sheets of the placed document.

The print sheet related information includes, for example, the presence or absence of a print sheet placed on the manual feed tray, and the sheet type of the print sheet.

The prediction condition information 53 stores, in advance, a plurality of prediction information, each of which associates the document and print sheet related information with the proposal processing that is predicted to be executed by the user when a condition regarding the document and print sheet related information is met.

However, when the document related information is only used to predict the processing content to be presented to the user, the prediction condition information 53 may store the prediction condition information 53 including the document related information and the proposal processing associated with the document in advance.

Alternatively, when the print sheet related information is only used to predict the processing content to be presented to the user, the prediction condition information 53 may store the prediction condition information 53 including the print sheet related information and the proposal processing associated with the print sheet in advance.

The prediction condition information 53 may be set in advance, for example, before the image forming device 1 is shipped, when the image forming device 1 is installed, or before the shipping person of the manufacturing company, the person who installs the image forming device 1, or the administrator of the company that purchased the image forming device 1 actually operates the image forming device 1.

Alternatively, the image forming device 1 may be configured so that the administrator checks the usage status of the image forming device 1, and adds, changes or deletes the content of the prediction condition information 53 if necessary, based on an opinion of the user who uses the image forming device 1 and the like after the image forming device 1 is actually operated.

Further, the image forming device 1 may be configured so that the prediction condition information 53 based on the content of the job executed by the user can be added manually or automatically after the image forming device 1 is actually operated.

FIG. 2 illustrates an explanatory diagram of an embodiment of the prediction condition information 53 stored in the storage 50.

The prediction condition information 53 in FIG. 2 illustrates thirteen types of prediction information based on the combination of the document related information, the print sheet related information, and the proposal processing. Note that the prediction condition information 53 is not limited to the thirteen types of prediction information. Necessary information may be added to, modified to, or deleted from the prediction condition information 53.

The document related information is information which includes the presence or absence of a document on the document table 41, the presence or absence of a document in the ADF 42, the size of the document, and the number of sheets of the document.

The print sheet related information is information which includes the presence or absence of a print sheet on the manual feed tray and the type of the input sheet.

The function name of the processing to be proposed is stored in the proposal processing.

For example, "business card scan" means that the function proposed to the user is a function for scanning a business card.

The prediction information A1 to A6 in the prediction condition information 53 are prediction condition information when a document is placed either on the document table 41 or in the ADF 42, and no print sheet is placed on the manual feed tray.

Further, the prediction information B1 and B2 are prediction condition information when no document is placed either on the document table 41 or in the ADF 42, but a print sheet is placed on the manual feed tray.

The prediction information C1 to C5 are prediction condition information when a document is placed either on the document table 41 or in the ADF 42, and a print sheet is placed on the manual feed tray.

In FIG. 2, for example, the prediction condition information 53 of the prediction information A1 is stored such that the proposal processing called "business card scan" is associated with the condition that a document is placed on the document table 41, the size of the document is the business card size, the number of sheets of the placed document is one, and there is no print sheet on the manual feed tray.

That is, when the document information acquirer 24 and the sheet information acquirer 25 acquire information indicating that "there is a document on the document table 41", "the size of the document is the business card size", "the number of sheets of the document is one", and "there is no print sheet on the manual feed tray", the processing predictor 26 confirms the prediction condition information 53 in FIG. 2, recognizes that the acquired information corresponds to the condition of the prediction condition information 53 of the prediction information A1, and acquires "business card scan" set in the prediction information A1 as the proposal processing.

Figure 3:
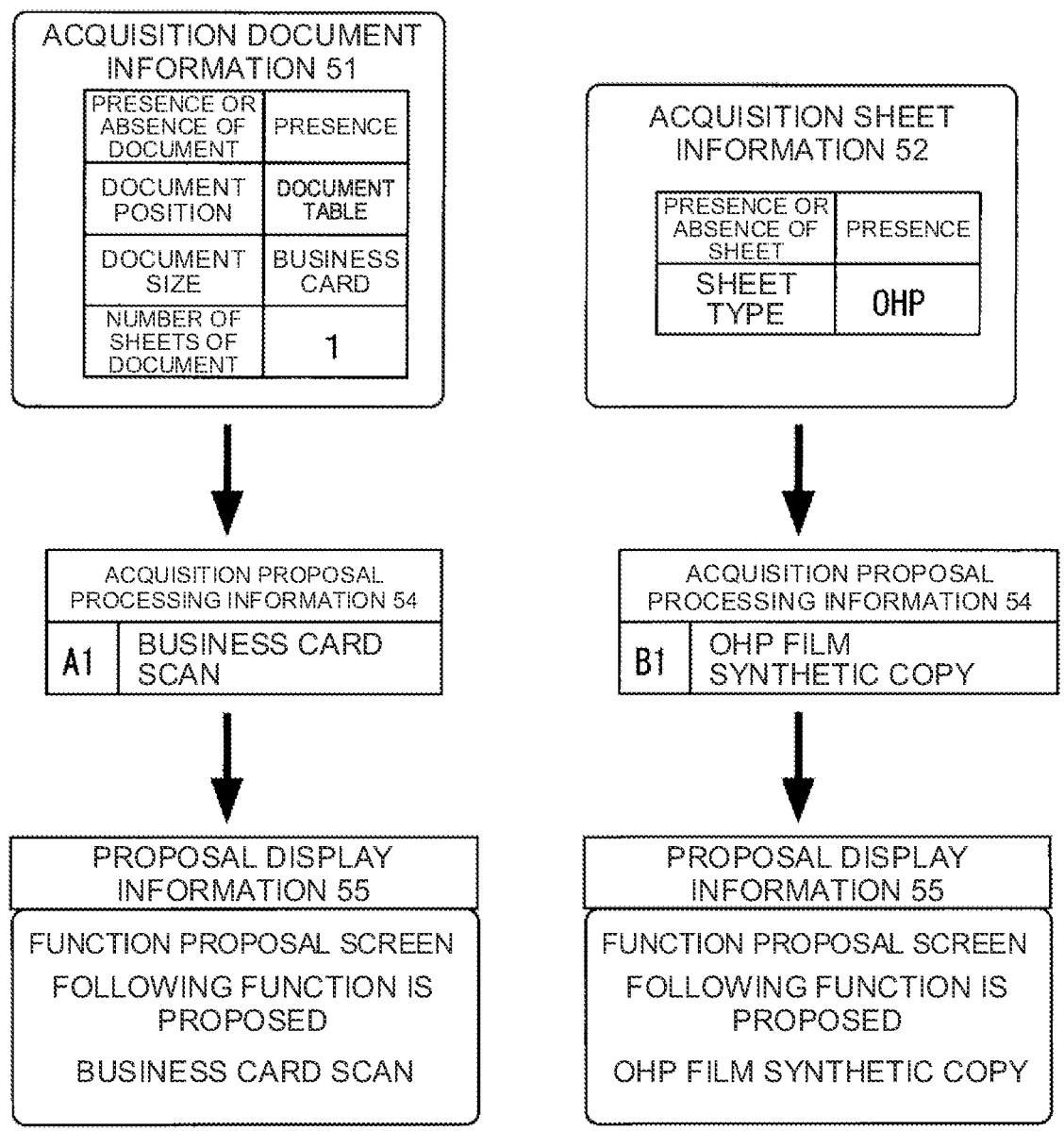
FIG. 3 is an explanatory diagram of an embodiment showing the relationship between the acquired information for a document and a print sheet and the display information to be acquired according to the present invention.

FIG. 3 illustrates an explanatory diagram of an embodiment showing the relationship between information regarding the acquired document and print sheet, and display information to be acquired.

The left side in FIG. 3 illustrates an embodiment of the relationship among the acquisition document information 51, the acquisition proposal processing information 54, and the proposal display information 55.

As described above, when the document information acquirer 24 acquires the information that "there is a document on the document table 41", "the size of the document is the business card size", and "the number of sheets of the document is one", information indicating "presence or absence of document: presence", "document position: document table", "document size: business card", "number of sheets of document: one" is stored, as illustrated in the acquisition document information 51 on the left side in FIG. 3.

On the other hand, although the sheet information acquirer 25 acquires information indicating that "there is no print sheet on the manual feed tray", the information is omitted on the left side in FIG. 3.

When the acquisition document information 51 and the prediction condition information 53 in FIG. 2 are compared with each other, and there is the information in which the condition corresponding to the acquisition document information 51 is set in the prediction condition information 53, the proposal processing associated with the information is acquired.

That is, the acquisition document information 51 on the left side in FIG. 3 corresponds to the condition of the prediction information A1 in the prediction condition information 53 in FIG. 2. Therefore, the proposal processing "business card scan" associated with the prediction information A1 is acquired, and the acquisition proposal processing information 54 illustrated on the left side in FIG. 3 is stored. That is, "business card scan" is stored as the acquisition proposal processing information 54.

Thereafter, as will be described later, the proposal display information 55 corresponding to "business card scan" is generated, and the function proposal screen illustrated on the left side in FIG. 3 is displayed.

The acquisition proposal processing information 54 is the content of the proposal processing acquired by the processing predictor 26 by using the prediction condition information 53.

As described above, when the acquired document related information (acquisition document information 51) corresponds to the condition of the prediction information A1 of the prediction condition information 53, "business card scan" is acquired as the corresponding proposal processing, and "business card scan" is stored in the acquisition proposal processing information 54, as illustrated on the left side in FIG. 3.

The proposal display information 55 is information, which is generated by the proposal processing generator 27, and is related to the proposal processing to be displayed on the display 13, in order to present the acquired proposal processing to the user.

For example, as illustrated on the left side in FIG. 3, when "business card scan" is stored in the acquisition proposal processing information 54, the proposal processing generator 27 generates the proposal display information 55.

Figure 6:
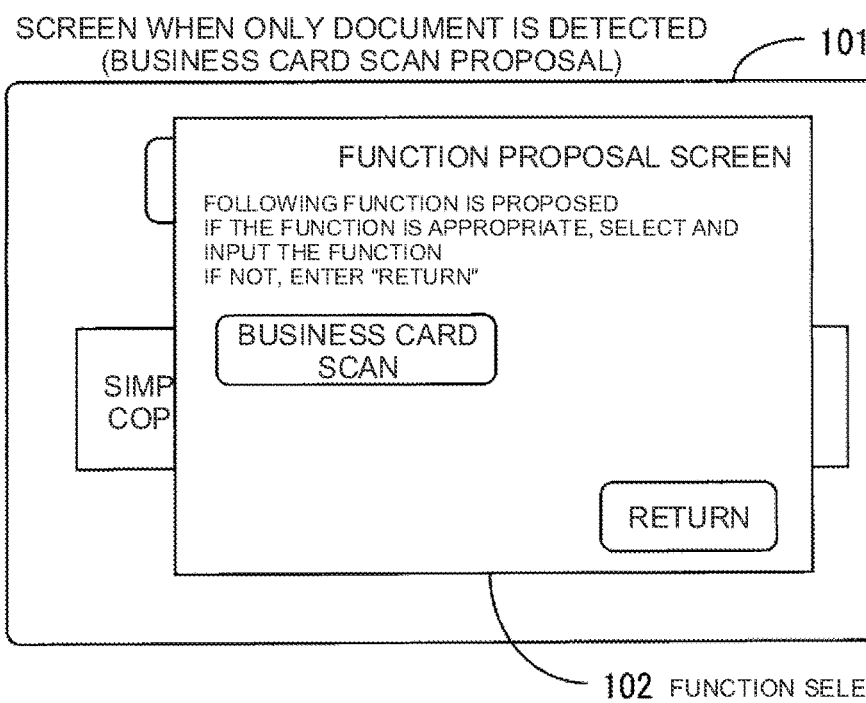
FIG. 6 is an explanatory diagram of an embodiment of a function proposal screen displayed on the display when only a document is detected according to the present invention.

The proposal display information 55 in this case includes, for example, information indicating "function proposal screen, the following function is proposed. business card scan", as illustrated on the left side in FIG. 3, and the function proposal screen as illustrated in FIG. 6, which will be described later, is displayed on the display 13.

Embodiment of Document and Print Sheet Related Information and Proposal Processing to be Acquired As described above, when the information illustrated on the left side in FIG. 3 is acquired as the acquisition document information 51, the acquisition document information 51 corresponds to the condition of the prediction information A1 of the prediction condition information 53. Therefore, "business card scan" associated with the prediction information A1 of the prediction condition information 53 is stored as the acquisition proposal processing information 54, and the proposal display information 55 corresponding to "business card scan" is generated.

The prediction condition information 53 also indicates other information in addition to this. An embodiment of the proposal processing to be acquired will be described below for some other information.

First Embodiment of Proposal Processing

The right side in FIG. 3 illustrates a case where the acquired document and print sheet related information corresponds to the prediction information B1 of the prediction condition information 53.

Here, it is assumed that the acquisition sheet information 52 is "presence or absence of sheet: presence" and "sheet type: OHP". That is, it is assumed that a print sheet is placed on the manual feed tray, and the type of the print sheet is an OHP film.

Although not illustrated, it is assumed that no document is placed on the document table 41 or in the ADF 42, there is in a state indicating no document, and neither the document size nor the number of sheets of a document is obtained.

In this case, the document related information is not acquired, only the print sheet related information is acquired, and the acquired acquisition sheet information 52 corresponds to the condition of the prediction information B1 of the prediction condition information 53.

Therefore, "OHP film synthetic copy" is set as the proposal processing corresponding to the acquisition sheet information 52 from the prediction information B1 of the prediction condition information 53. Further, as illustrated on the right side in FIG. 3, "OHP film synthesis copy" associated with the prediction information B1 of the prediction condition information 53 is stored as the acquisition proposal processing information 54.

Further, as illustrated on the right side in FIG. 3, when "OHP film synthesis copy" is stored in the acquisition proposal processing information 54, the proposal processing generator 27 generates the proposal display information 55.

That is, as the proposal processing, the display information for presenting "OHP film synthesis copy" to the user is generated.

As illustrated on the right side in FIG. 3, the proposal display information 55 in this case includes, for example, information indicating "function proposal screen, the following function is proposed. OHP film synthetic copy". The display 13 displays the content of the proposal processing by using the proposal display information 55.

Second Embodiment of Proposal Processing

Figure 4:
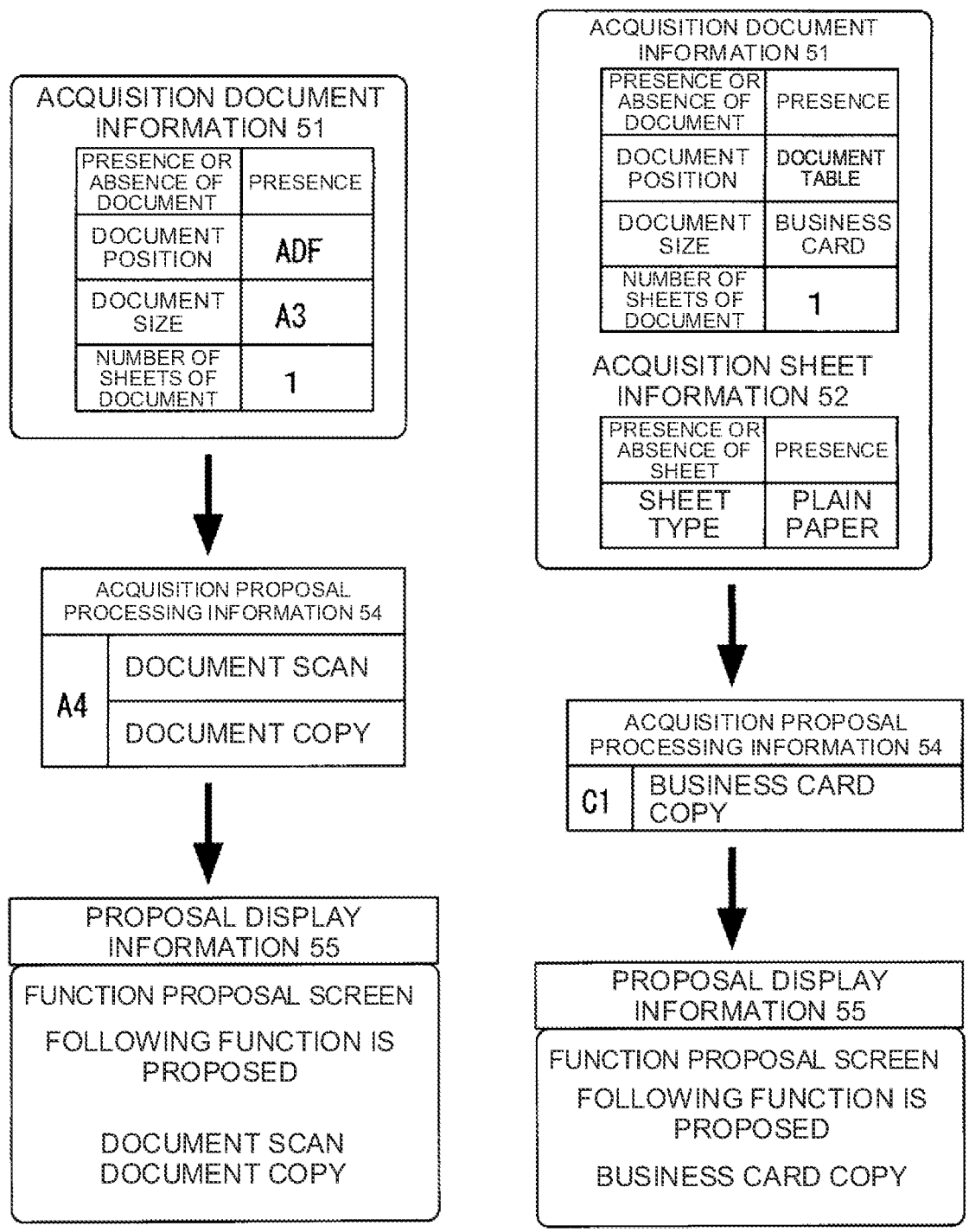
FIG. 4 is an explanatory diagram of an embodiment showing the relationship between the acquired information for a document and a print sheet and the display information to be acquired according to the present invention.

FIG. 4 illustrates an explanatory diagram of an embodiment showing the relationship between the acquired document and print sheet information and the display information to be acquired, as in FIG. 3.

The left side in FIG. 4 illustrates a case where the acquired document and print sheet related information corresponds to the prediction information A4 of the prediction condition information 53.

Here, it is assumed that the acquisition document information 51 is "presence or absence of document: presence", "document position: ADF", "document size: A3", and "number of sheets of document: one", as illustrated on the left side in FIG. 4.

That is, it is assumed that a document is placed in the ADF 42, the document size is A3, and the number of sheets of the document is one.

Further, although not illustrated, it is assumed that no print sheet is placed on the manual feed tray, the manual feed tray is in a state of no print sheet, and the sheet type is not input and is not acquired.

In this case, the print sheet related information is not acquired, and only the document related information is acquired, and the acquired acquisition document information 51 corresponds to the condition of the prediction information A4 of the prediction condition information 53.

Therefore, two functions of "document scan" and "document copy" are set as the proposal processing corresponding to the acquisition document information 51 from the prediction information A4 of the prediction condition information 53. Further, as illustrated on the left side in FIG. 4, "document scan" and "document copy" associated with the prediction information A4 of the prediction condition information 53 are stored as the acquisition proposal processing information 54.

In the case of the prediction information A4 of the prediction condition information 53, there is a possibility that either or both of "document scan" and "document copy" may be selected as the function to be predicted that the user intends to execute. Therefore, the two functions are preset as the proposal processing.

Further, as illustrated on the left side in FIG. 4, when "document scan" and "document copy" are stored in the acquisition proposal processing information 54, the proposal processing generator 27 generates the proposal display information 55.

That is, as the proposal processing, the display information for presenting "document scan" and "document copy" to the user is generated.

The proposal display information 55 in this case includes information indicating, for example, "function proposal screen, the following functions are proposed. document scan, document copy", as illustrated on the left side in FIG. 4. Further, the display 13 displays the content of the proposal processing by using the proposal display information 55.

Third Embodiment of Proposal Processing

Next, a case where the acquired document and print sheet related information corresponds to the prediction information C1 of the prediction condition information 53 is illustrated on the right side in FIG. 4.

Here, it is assumed that the acquisition document information 51 is "presence or absence of document: presence", "document position: document table", "document size: business card", and "number of sheets of the document: one", as illustrated on the right side in FIG. 4.

That is, it is assumed that a document is placed on the document table 41, the document size is a business card, and the number of sheets of the document is one.

Further, it is assumed that the acquisition sheet information 52 is "presence or absence: presence" and "sheet type: plain paper". That is, it is assumed that a print sheet is placed on the manual feed tray, and the type of the print sheet is plain paper.

In this case, the document related information is acquired, and the print sheet related information is also acquired. Therefore, the acquired acquisition document information 51 and the acquisition sheet information 52 correspond to the condition of the prediction information C1 of the prediction condition information 53.

Therefore, the function of "business card copy" is set as the proposal processing corresponding to the acquisition document information 51 and the acquisition sheet information 52 from the prediction information C1 of the prediction condition information 53. Further, "business card copy" associated with the prediction information C1 of the prediction condition information 53 is stored as the acquisition proposal processing information 54, as illustrated on the right side in FIG. 4.

Further, as illustrated on the right side in FIG. 4, when "business card copy" is stored in the acquisition proposal processing information 54, the proposal processing generator 27 generates the proposal display information 55.

That is, as the proposal processing, the display information for presenting "business card copy" to the user is generated.

The proposal display information 55 in this case includes information, for example, indicating "function proposal screen, the following function is proposed. business card copy", as illustrated on the right side in FIG. 4. Further, the display 13 displays the content of the proposal processing by using the proposal display information 55.

Another Embodiment of Proposal Processing

The proposal processing corresponding to the document and the print sheet is not limited to the above-described embodiments.

For example, as in the prediction information C2 of the prediction condition information 53 illustrated in FIG. 2, when it is detected that one envelope is placed on the document table 41, or it is detected or input that an envelope is placed on the manual feed tray, a print sheet (envelope) with a special shape and a special material may be printed. Therefore, the copy with range designation and erase execution in a base removal copy (base removal and range designation erase copy) may be displayed as the proposal processing.

Further, as in the prediction information C3 of the prediction condition information 53 illustrated in FIG. 2, when it is detected that a document with one sheet having A4 size is placed on the document table 41, and it is detected and input that a print sheet having A4 size has been placed on the manual feed tray, if other paper tray or cassette is already storing recycled paper having A4 size, in order to facilitate the use of the recycled paper, it may be indicated that there is recycled paper on the another paper tray, and copying by the recycled paper may be displayed as the proposal processing.

Further, as in the prediction information C5 of the prediction condition information 53 illustrated in FIG. 2, when it is detected that a document with two or more sheets having A4 size is placed in the ADF 42, and it is detected and input that a print sheet having A3 size is placed on the manual feed tray, copying (two in one copy) for adjusting the document reading size and printing a document with two sheets having A4 size on one print sheet having A3 size may be displayed as the proposal processing.

Embodiment of Information Displayed on Display Screen

FIGS. 5 to 9 illustrate embodiments of information displayed on the display screen.

Here, in addition to an initial screen (function selection screen) displayed on the display 13, in particular, embodiments of the function proposal screen for presenting the content of the proposal processing to the user on the display 13 when the proposal processing is acquired will be described.

Embodiment of Initial Screen

Figure 5:
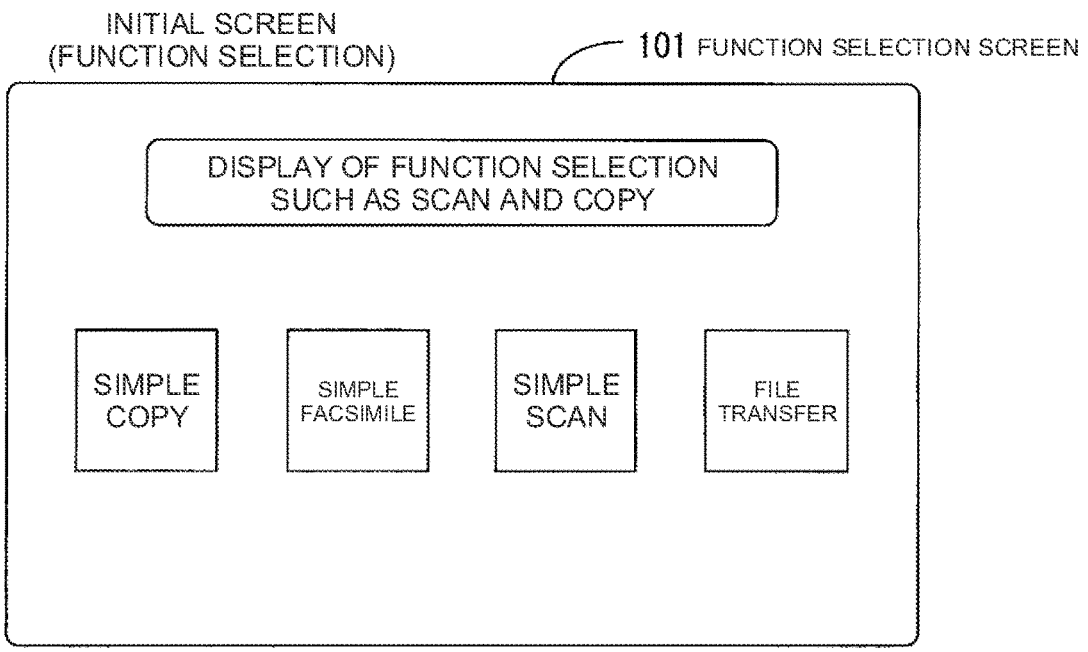
FIG. 5 is an explanatory diagram of an embodiment of an initial screen (function selection screen) displayed on a display according to the present invention.

FIG. 5 illustrates an explanatory diagram of an embodiment of an initial screen (function selection screen) displayed on the display 13 according to the present invention.

FIG. 5 illustrates an initial screen for selecting a function available in the image forming device 1, that is, a function selection screen 101.

The function selection screen 101 displays a plurality of functions which can be selected by the user.

FIG. 5 illustrates four functions (simple copy, simple facsimile, simple scan, file transfer).

Note that, when the function usable in the image forming device 1 is not limited to the fourth functions, a larger number of functions are displayed on the single function selection screen 101. Alternatively, the larger number of functions are displayed on the plurality of function selection screens 101.

When the function proposal screen in which the processing that the user intends to execute is predicted by associating with the acquired document and print sheet related information is not displayed, the user finds a desired function from a plurality of functions displayed on the function selection screen 101, and performs an input operation to select the function.

As the number of functions available to the image forming device 1 is larger, the user who is not accustomed to the operation may take more time to find a desired function, and the operation load of the user may become heavier, and the user may have a longer time to execute the desired function.

Therefore, according to the present invention, for the purpose of reducing the operational burden on the user, for example, when the function selection screen 101 as illustrated in FIG. 5 is displayed, the document and print sheet related information is acquired, and the acquired information can match any one of the conditions of the prediction condition information 53, the function proposal screen illustrating the proposal processing associated with the condition is automatically displayed.

An embodiment of the function proposal screen and the like will be described below.

First Embodiment of Function Proposal Screen

FIG. 6 illustrates an explanatory diagram of an embodiment of the function proposal screen displayed on the display 13 when only a document is detected according to the present invention.

Here, an embodiment of the function proposal screen displayed on the display screen when the user places one "business card" corresponding to a document on the document table 41 is illustrated.

Further, it is assumed that no print sheet is placed on the manual feed tray.

First, it is assumed that, in a state in which the initial screen (function selection screen 101) illustrated in FIG. 5 is displayed on the display 13, the user places one "business cards" on the document table 41 without selecting any function.

At this time, the document presence/absence detector 21 detects that a document is placed on the document table 41.

Further, when the document table 41 has the document size detector 22 for detecting the size of the document, the document presence/absence detector 21 can detect that the size of the document placed on the document table 41 is the size of the business card.

In this case, the document presence/absence detector 21 detects that a document is placed on the document table 41, the size of the document is the size of the business card, and also no print sheet is placed on the manual feed tray. Accordingly, the acquisition document information 51 on the left side in FIG. 3 is acquired.

The acquired acquisition document information 51 and the prediction condition information 53 are compared with each other, and a condition that can match with the acquisition document information 51 is searched, and it is confirmed that the searched condition is a state corresponding to the prediction information A1 of the prediction condition information 53 illustrated in FIG. 2.

According to the prediction condition information 53 illustrated in FIG. 2, it can be recognized that the proposal processing associated with the prediction information A1 of the prediction condition information 53 is "business card scan". That is, "business card scan" is set in the acquisition proposal processing information 54.

Therefore, in order to notify the user of the proposal processing of "business card scan", the proposal display information 55 including the business card scan is generated.

The generated proposal display information 55 is displayed on the display 13 as a function proposal screen 102, as illustrated in FIG. 6.

The function proposal screen 102 in FIG. 6 displays, for example, the display indicating that the proposal processing is "business card scanning", the selection area for "return", and the sentence indicating that "If this function is appropriate, please select and input the function. If not, enter "return".

When the user looks at the function proposal screen 102, and recognizes that "business card scan" is the function that the user intends to execute, the user may enter for selecting the area where "business card scan" is displayed.

On the other hand, when the proposed "business card scan" is not the function that the user intends to execute, the user may enter for selecting the selection area for "return" area.

The function proposal screen 102 may be displayed on top of the initial screen (function selection screen) 101, as illustrated in FIG. 6. Alternatively, only the function proposal screen 102 may be displayed on the display 13 by deleting the initial screen.

Further, in FIG. 6, the content of the proposal processing is displayed by a character. However, the content is not limited thereto, and may be displayed by using a symbol, a figure, an image, an animation, and the like other than a character. Further, the function proposal screen 102 may be displayed such that the part of the content of the proposal processing indicating "business card scan" is displayed in characters having a color, a typeface, or a thickness different from those of the characters in the other display part, or blinked, so that the part is conspicuous.

In addition, when a voice output function is provided, the content of the proposal processing may be notified by voice.

First Embodiment of Function Selection Screen

Figure 7:
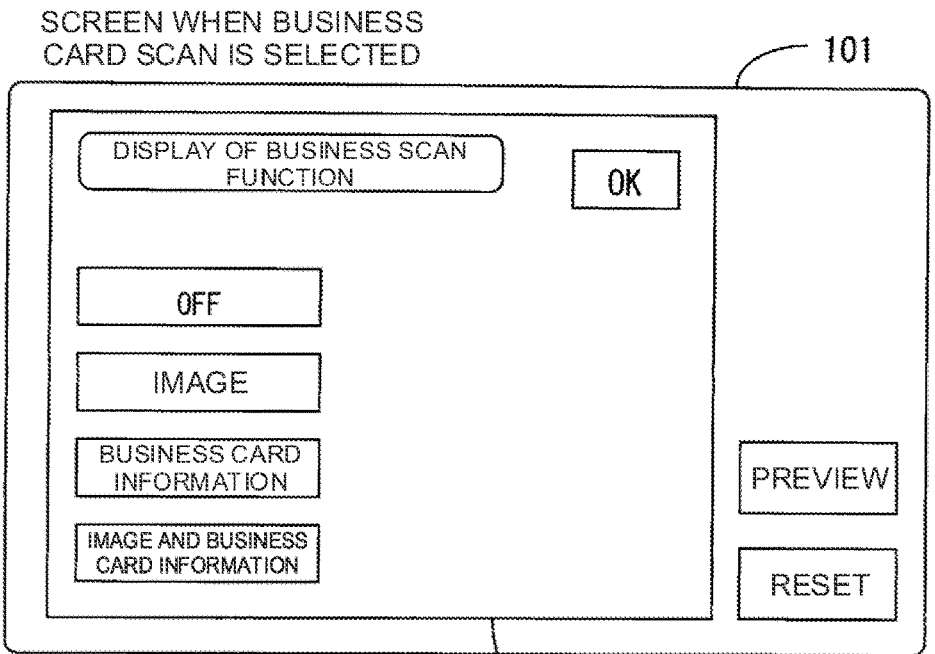
FIG. 7 is an explanatory diagram of an embodiment of the function selection screen displayed when the displayed proposal function (business card scan) is selected according to the present invention.

FIG. 7 illustrates an explanatory diagram of an embodiment of the function selection screen displayed when the displayed proposal function (business card scan) is selected according to the present invention.

FIG. 7 is an embodiment of a screen displayed when "business card scan" is selected.

When the user selects the area in which "business card scan" is displayed in a state where the function proposal screen 102 illustrated in FIG. 6 is displayed, a function selection screen 103 illustrated in FIG. 7 is displayed.

Information related to the business card scan function is displayed in the function selection screen 103.

In FIG. 7, for example, the display area of "OFF" means that the business card scan function is invalid. When "OFF" is selected and input, the business card scan function is set to be invalid.

The display area of "image" means that the read image of a business card is acquired as image data. When "image" is selected and input, the function of acquiring the read image of the business card as image data is enabled.

The display area of "business card information" means that the read image of the business card is character-recognized, and processed as character information. When "business card information" is selected and input, the function of character-recognizing the read image of the business card, and processing the character-recognized read image as character information is enabled.

The display area of "image and business card information" means that the read image of the business card is acquired as image data, and the read image of the business card is character-recognized, and processed as character information. When "image and business card information" is selected and input, the function of acquiring the read image of the business card as image data, and the function of character-recognizing the read image of the business card and processing the character-recognized read image as character information are enabled.

The display area of "OK" means that the setting related to the business card scan function is confirmed. When "OK" is selected and input, the setting related to the business card scan function is confirmed.

The display area of "preview" is a selection area for confirming the reading state of the business card in advance. When "preview" is selected and input, the read image of the business card is displayed on the display screen before the read image of the business card obtained by executing the reading operation of the business card is transmitted to a predetermined destination.

The display area of "reset" is a selection area for canceling the business card scan function. When "reset" is selected and input, for example, the screen to be displayed turns to the initial screen.

Second Embodiment of Function Proposal Screen

Figure 8:
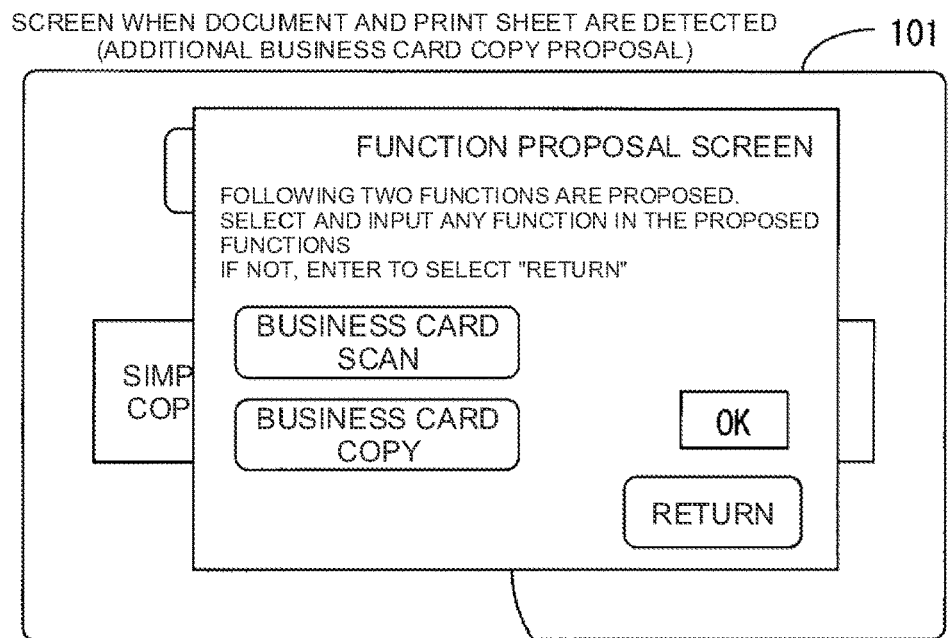
FIG. 8 is an explanatory diagram of an embodiment of the function proposal screen displayed on the display when a document and a print sheet are detected according to the present invention.

FIG. 8 illustrates an explanatory diagram of an embodiment of the function proposal screen displayed on the display when a document and a print sheet are detected according to the present invention. Here, FIG. 8 illustrates an embodiment of the function proposal screen displayed on the display screen when the user places one "business card" corresponding to a document on the document table 41, and then places a print sheet (for example, plain paper) on the manual feed tray.

First, as mentioned the above, when the user places one "business card" on the document table 41 without selecting any function in the display state illustrated in FIG. 5, the acquisition document information 51 on the left side in FIG. 3 is acquired, and the function proposal screen 102 illustrating "business card scan" as the proposal processing is displayed, as illustrated in FIG. 6.

In this state, "business card scan" is set in the acquisition proposal processing information 54.

Thereafter, it is assumed that after a predetermined time has elapsed (for example, after 30 seconds), the user places a print sheet on the manual feed tray, and selects and inputs plain paper as the sheet type.

In this case, the manual feed sheet detector 23 detects that a print sheet is placed on the manual feed tray, and plain paper is acquired as the information of the sheet type. Therefore, the acquisition sheet information 52 including information indicating "there is a sheet on the manual feed tray" and "plain paper" is acquired.

The acquired acquisition document information 51, the acquisition sheet information 52, and prediction condition information 53 are compared with one another, and a condition that can match with the acquisition document information 51 and the acquisition sheet information 52 is searched, and it is confirmed that the condition is a state corresponding to the prediction information C1 of the prediction condition information 53 illustrated in FIG. 2.

According to the prediction condition information 53 illustrated in FIG. 2, it can be recognized that the proposal processing associated with the prediction information C1 of the prediction condition information 53 is "business card copy".

Here, "business card scan" has already been set in the acquisition proposal processing information 54, and the user places a print sheet on the manual feed tray after a predetermined time has elapsed. Therefore, it is assumed that "business card copy" is additionally set in the acquisition proposal processing information 54 without deleting "business card scan".

In this case, "business card scan" and "business card copy" are set in the acquisition proposal processing information 54. Therefore, in order to notify the user of the proposal processing of "business card scan" and "business card copy", the proposal display information 55 including the business card scan and the business card copy is generated.

The generated proposal display information 55 is displayed on the display 13 as a function proposal screen 104, as illustrated in FIG. 8.

The function proposal screen 104 in FIG. 8 displays, for example, the display indicating that there are two processing of "business card scan" and "business card copy" as the proposal processing, the selection area for "return", and the sentence indicating that "The following two functions are proposed. Please select and input any of the proposal functions. If not, enter "return".

When the user looks at the function proposal screen 104, and "business card copy" is the function that the user intends to execute, the user may input to select the area in which "business card copy" is displayed.

Further, when "business card scan" is the function that the user intends to execute, the user may input to select the area in which "business card scan" is displayed.

Alternatively, the user may desire to execute both the functions for "business card scan" and "business card copy". For example, when the user selects and inputs both the display area of "business card scan" and the display area of "business card copy", and then the user inputs to select the display area of "OK", the business card copy function may be executed, immediately after the user confirms the function to be executed and the business card scan function is executed.

On the other hand, when the function that the user intends to perform is neither "business card scan" nor "business card copy", which are proposed, the user may input to select the selection area for "return".

FIG. 8 illustrates a case where two proposal processing are displayed when the user places a document, and then places a print sheet on the manual feed tray.

However, after the print sheet is placed on the manual feed tray, the state becomes a state corresponding to the prediction information C1 of the prediction condition information 53 illustrated in FIG. 2. Therefore, as the proposal processing, only "business card copy" associated with the prediction information C1 of the prediction condition information 53 may be set, and "business card scan" may be deleted. In this case, the function proposal screen 104 may display in such a manner as to indicate that there is "business card copy" as the proposal processing.

Second Embodiment of Function Selection Screen

Figure 9:
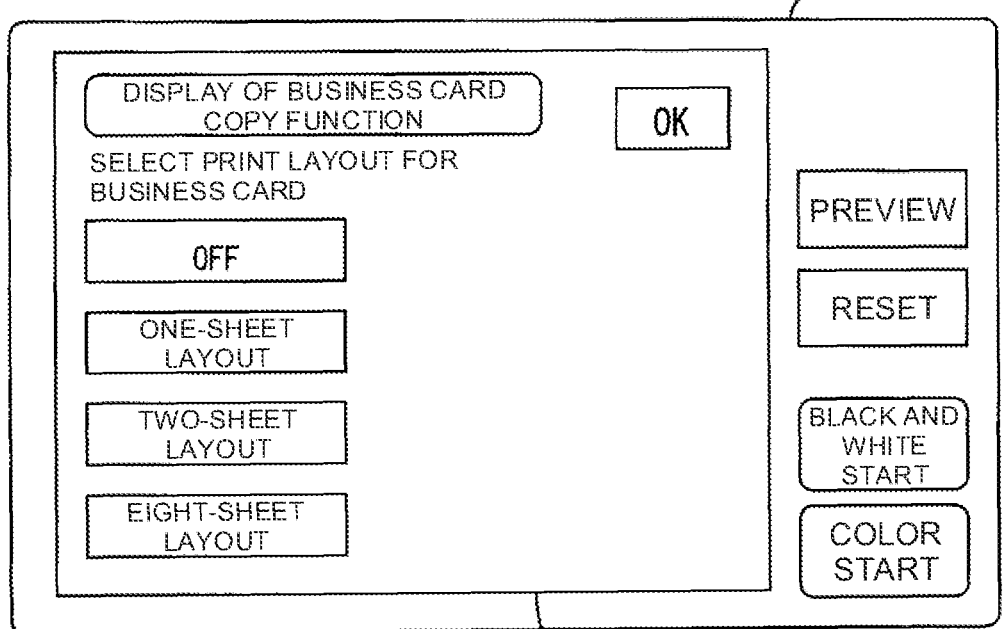
FIG. 9 is an explanatory diagram of an embodiment of the function selection screen displayed when the displayed proposal function (business card copy) is selected according to the present invention.

FIG. 9 illustrates an exemplary embodiment of the function selection screen displayed when the displayed proposal function (business card copy) is selected according to the present invention.

FIG. 9 illustrates an embodiment of a screen displayed when "business card copy" is selected.

When the user inputs to select the area where "business card copy" is displayed in a state in which the function proposal screen 104 in FIG. 8 is displayed, a function selection screen 105 illustrated in FIG. 9 is displayed.

The function selection screen 105 displays information related to the business card copy function.

In FIG. 9, for example, the display area of "OFF" indicates that the business card copy function is invalid. When "OFF" is selected and input, the business card copy function is set to be invalid.

The display area of "one-sheet layout" means that the number of images of a business card placed on one print sheet is one. When "one-sheet layout" is selected and input, the number of images of a business card placed on one print sheet becomes one.

The display area of "two-sheet layout" means that the number of images of a business card placed on one print sheet means two. When "two-sheet layout" is selected and input, the number of images of a business card placed on one print sheet becomes two.

The display area of "eight-sheet layout" means that the number of images of a business card placed on one print sheet is eight. When "eight-sheet layout" is selected and input, the number of images of a business card placed on one print sheet becomes eight.

The display area of "OK" means that the setting related to the business card copy function is confirmed. When "OK" is selected and input, the setting related to the business card copy function is confirmed.

The display area of "preview" is a selection area for confirming the reading state of a business card in advance. When "preview" is selected and input, the reading image of a business card is displayed on the display screen before the read image of the business card obtained by executing the reading operation of the business card is printed on a predetermined print sheet.

The display area of "reset" is a selection area for canceling the business card copy function. When "reset" is selected and input, for example, the screen to be displayed returns to the initial screen.

The display area of "black-and-white start" means to start copying in black. When "black-and-white start" is selected and input, the business card placed on the document table 41 is scanned, and printed in black and white on the print sheet placed on the manual feed tray.

The display area of "color start" means to start copying in color. When "color start" is selected and input, the business card placed on the document table 41 is scanned, and printed in color on the print sheet placed on the manual feed tray.

Embodiment of Prediction Proposal Processing

The flowcharts of some embodiments of the prediction proposal processing will be described below.

First Embodiment: Prediction Proposal Processing when Only Document is Detected

In a first embodiment, a description will be given of the prediction proposal processing in which when a user places a document, the processing predictor 26 acquires the proposal processing associated in advance with the placed document, and the proposal processing generator 27 generates information related to the acquired proposal processing and presents the proposal processing to the user.

Figure 10:
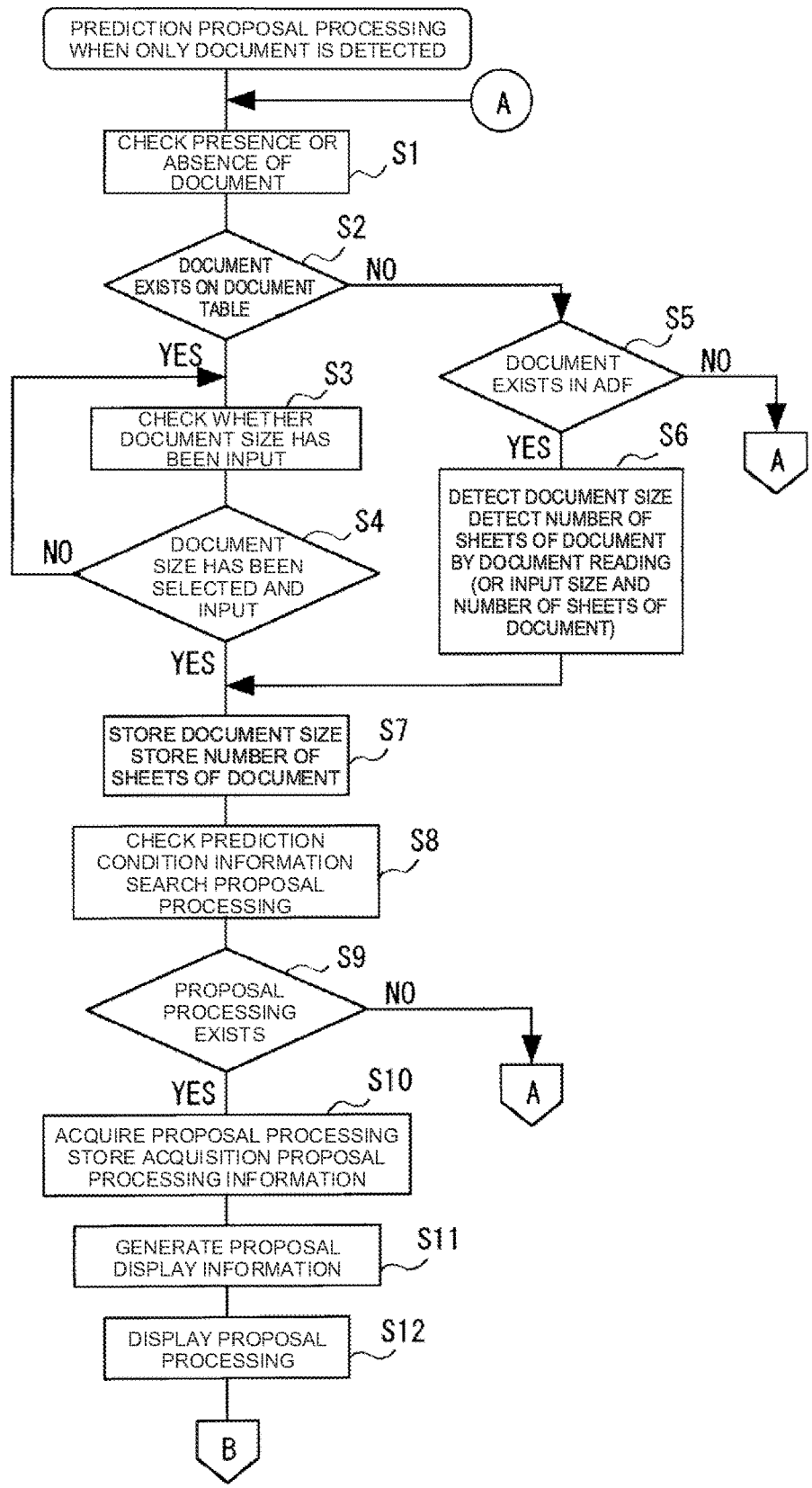
FIG. 10 is a flowchart illustrating an embodiment of prediction proposal processing that displays proposal processing to a user when only a document is detected according to the present invention.
Figure 11:
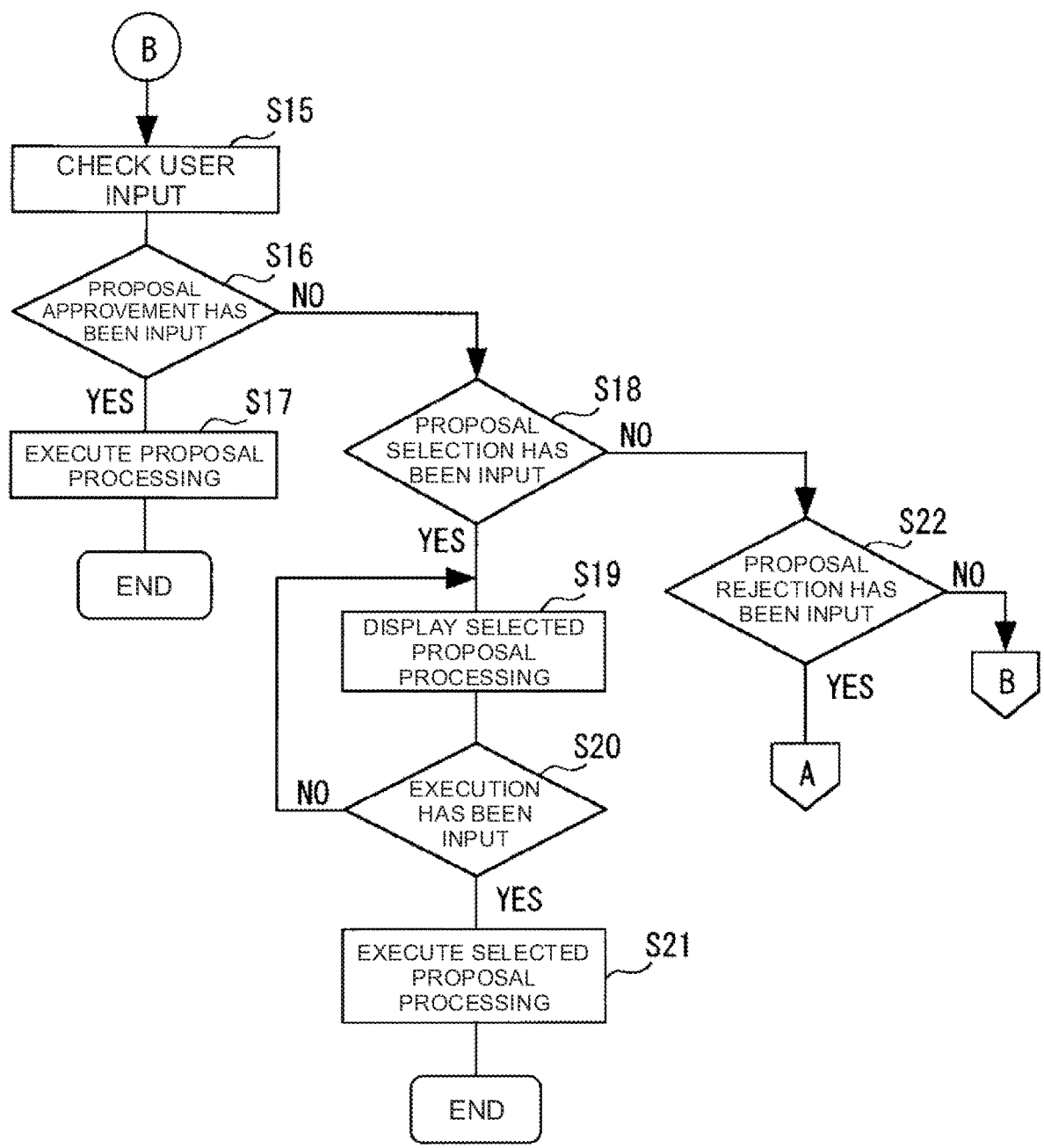
FIG. 11 is a flowchart illustrating an embodiment of the prediction proposal processing that displays the proposal processing to the user when only a document is detected according to the present invention.

FIGS. 10 and 11 illustrate a flowchart of an embodiment of the prediction proposal processing for displaying the proposal processing to the user when only a document is detected.

Here, the prediction proposal processing is performed by acquiring only the information of the document placed on the document table 41 or in the ADF 42, without considering the state of the print sheet placed on the manual feed tray.

In step S1 in FIG. 10, the document presence/absence detector 21 checks the presence or absence of a document.

When there is a document on the document table 41 in step S2, the processing proceeds to step S3. If not, the processing proceeds to step S5.

In step S3, it is checked whether the size of the document has been input. When the document is placed on the document table 41, in principle, the user inputs the size of the document. Note that when the document table 41 has a document size detection mechanism, the size of the document may be automatically acquired.

Further, when a document having a plurality of sheets is placed on the document table 41, the number of sheets of the placed document is detected by the user inputting the number of sheets of the document, or performing a multi-crop scan. The multi-crop scan is a function of scanning the entire document table 41 on which a plurality of documents are placed, automatically detecting the position and size of the plurality of documents, and cutting out each document.

In step S4, when the user inputs the size of the document, the processing proceeds to step S7. If not, the processing returns to step S3.

In step S5, when there is a document in the ADF 42, the processing proceeds to step S6. If not, the processing returns to step S1.

In step S6, the document size detector 22 detects the size of the document placed in the ADF 42.

In order to detect the number of sheets of the document placed in the ADF 42, the document conveyance and reading processing are actually executed by the ADF 42. By the document conveyance, the number of sheets of the document placed in the ADF 42 is detected together with the size of the document.

The size and the number of sheets of the detected document are stored in the next step S7.

Alternatively, when an inquiry screen for inputting the size and the number of sheets of the document present in the ADF 42 is displayed, and the user knows the size and the number of sheets of the document in advance, the user may input the size and the number of sheets of the document placed in the ADF 42.

After detecting or inputting the size and the number of sheets of the document, the processing proceeds to step S7.

Further, although not illustrated, when the function for processing mixed documents is executed, that is, when a plurality of documents with different sizes are placed in the ADF 42, for example, also when a document with the size A4 and a document of the size A3 are mixed and placed, the size and the number of sheets of the mixed documents are similarly detected.

Note that the document size detector 22 can only detect the size of a document having the maximum size among a plurality of mixed documents. Therefore, when a plurality of documents having different sizes are placed in a mixed manner, it is necessary for the user to set and input that the plurality of documents having different sizes are mixed and placed.

For example, in order to select the function of scanning or copying the mixed documents, the selection area for "mixed document scan" or "mixed document copy" may be displayed on the function selection screen as illustrated in FIG. 5, and the user may select and input the selection area.

In the function selection screen, if the selection area for "mixed document scan" or the like is selected and input, the image forming device 1 determines that a plurality of documents having different sizes are to be mixed and placed in the ADF 42, and executes the automatic conveyance and reading processing for the mixed documents placed in the ADF 42 in step S6.

Alternatively, in order to correctly read a plurality of documents with different sizes, at step S6, first, a display screen may be displayed for the user to select and input whether the width of each document of the plurality of mixed documents is the same width or different width.

When the user selects and inputs that the width of each document is "the same width", all the mixed documents may be read as a document having the same width as the document which has been read first.

On the other hand, when the user selects and inputs that the width of each document is "different width", for example, all the mixed documents may be read as the document having the maximum readable width.

In step S7, the document information acquirer 24 stores the input or detected document size in the storage 50.

Further, when the number of sheets of a plurality of documents is input or detected, the document information acquirer 24 stores the number of sheets of each document in the storage 50.

The information is stored as the acquisition document information 51.

In step S8, the processing predictor 26 checks the prediction condition information 53 stored in the storage 50, and searches for the proposal processing corresponding to the size and the number of sheets of the detected document.

Here, the processing predictor 26 compares the acquired acquisition document information 51 with the condition related to the document in the prediction condition information 53, and checks whether there is the prediction condition information 53 that can match with the acquisition document information 51. When there is the prediction condition information 53 that can be matched, the processing predictor 26 acquires the proposal processing associated with the prediction condition information 53.

In step S9, when there is the prediction condition information 53 that can match with the acquisition document information 51 in the prediction condition information 53, that is, when there is the proposal processing corresponding to the acquisition document information 51, the processing proceeds to step S10, and if not, the processing returns to step S1.

In step S10, when there is the proposal processing corresponding to the acquisition document information 51, the processing predictor 26 acquires the proposal processing, and stores the proposal processing as the acquisition proposal processing information 54.

In step S11, the proposal processing generator 27 generates the proposal display information 55 by using the acquisition proposal processing information 54.

In step S12, the display 13 displays the acquired proposal processing as a function that the user may execute by using the generated proposal display information 55.

For example, the function proposal screen as illustrated in FIG. 6 is displayed.

Thereafter, the processing proceeds to step S15 in FIG. 11.

In step S15 in FIG. 11, it is checked whether the user has input.

In step S16, when the user has input for approving the displayed proposal processing, the processing proceeds to step S17, and if not, the processing proceeds to step S18.

In step S17, since the user has input for approving the proposal processing, the function executor 28 executes the proposal processing. For example, as illustrated in FIG. 6, in case that the function proposal screen for proposing "business card scan" is displayed, when the user has input for selecting the display area of "business card scan", the function executor 28 executes the function for the business card scan.

In step S18, in case that the plurality of proposal processing are displayed, when the user has input and selected for approving any of the displayed proposal processing, the processing proceeds to step S19, and if not, the processing proceeds to step S22.

In step S22, when the user has input for rejecting the displayed proposal processing, the processing returns to step S1 in FIG. 10, and if not, the processing returns to step S15. The input for rejecting the displayed proposal processing corresponds to, for example, that the user inputs for selecting the display area for "return" when the function proposal screen illustrated in FIG. 6 is displayed. In the case of returning to step S1, it is preferable to delete the function proposal screen.

In step S19, in order for the user to confirm the proposal processing selected by the user, the content of the selected proposal processing is displayed.

For example, the message "The selected proposal processing is the business card scan. Will the function be performed?" is displayed, and the display area for "execute" is also displayed. When the user looks at the display, and is willing to execute the function, the user inputs for selecting the display area for "execute".

In step S20, when the user inputs for executing the selected proposal processing, the processing proceeds to step S21, and if not, the processing returns to step S19.

In step S21, the function executor 28 executes the selected proposal processing.

When the execution of the proposal processing is completed, the flowchart ends.

As described above, in case that the user performs an operation of placing a document on the document table 41 or in the ADF 42, when the proposal processing corresponding to the information related to the document acquired based on the operation (acquisition document information 51) is stored in the prediction condition information 53, the proposal processing is displayed.

When the displayed proposal processing is the function that the user intends to execute, the proposal processing can be executed immediately by the user inputting to select the displayed proposal processing. Therefore, it is possible to reduce the burden on the user's operation and to shorten the time period until the actual proposal processing is executed after the document is placed.

Second Embodiment: Prediction Proposal Processing when Only Print Sheet is Detected In a second embodiment, a description will be given of the prediction proposal processing in which, when a user places a print sheet, the processing predictor 26 acquires proposal processing associated in advance with the placed print sheet, and the proposal processing generator 27 generates information related to the acquired proposal processing, and presents the proposal processing to the user.

Figure 12:
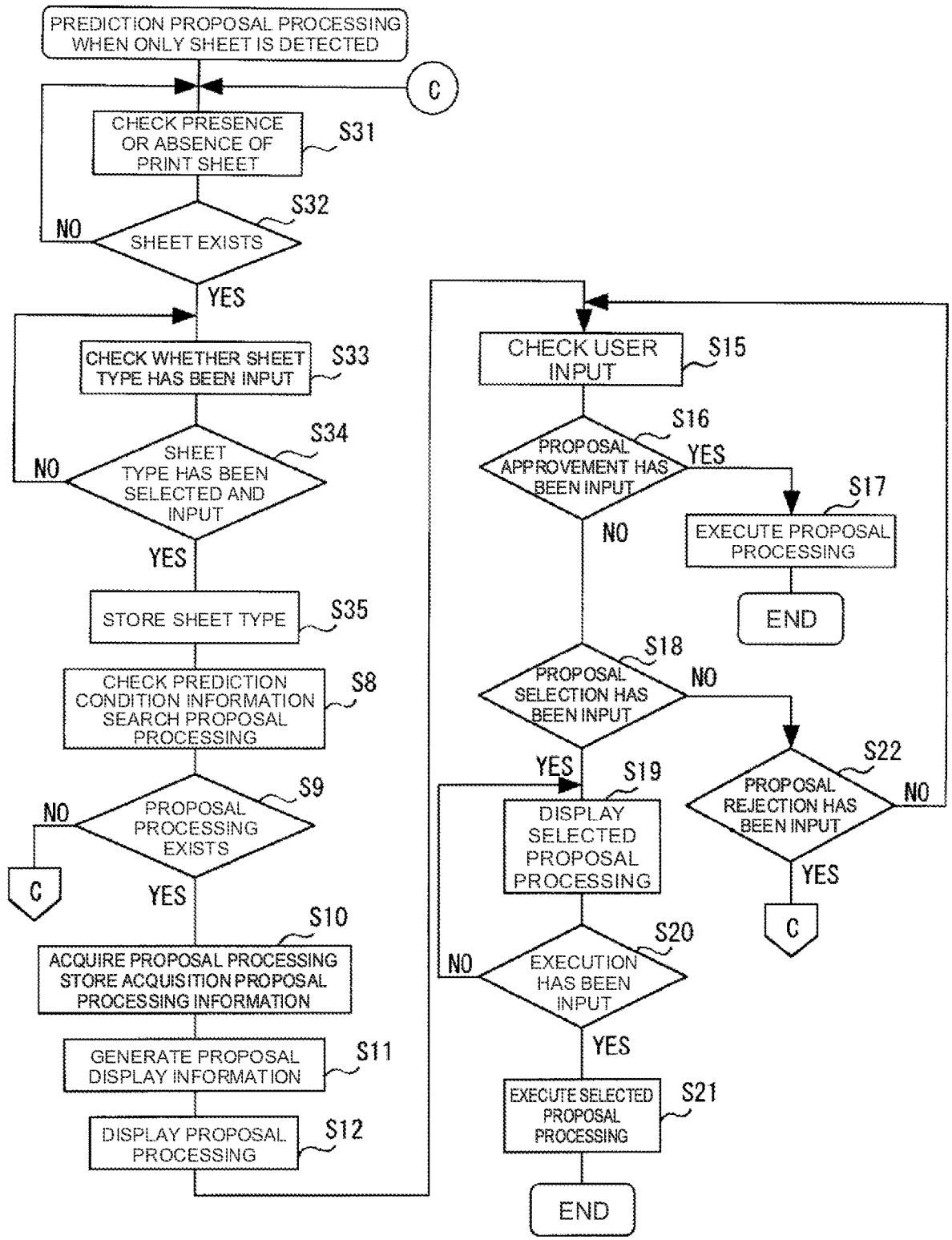
FIG. 12 is a flowchart illustrating an embodiment of prediction proposal processing that displays proposal processing to a user when only a print sheet is detected according to the present invention.

FIG. 12 illustrates a flowchart of an embodiment of the prediction proposal processing for displaying the proposal processing to the user when only a print sheet is detected.

Here, the prediction proposal processing is performed by acquiring only the information of the print sheet placed on the manual feed tray without considering the state of the document placed on the document table 41 or in ADF 42.

The same numbers are assigned to the steps that perform the same processing as the steps illustrated in FIGS. 10 and 11 described above.

In step S31 in FIG. 12, the manual feed sheet detector 23 checks the presence or absence of a print sheet.

Here, the manual feed sheet detector 23 checks whether the user has placed a print sheet on the manual feed tray.

In step S32, when there is a print sheet on the manual feed tray, the processing proceeds to step S33. If not, the processing returns to step S31.

In step S33, it is checked whether the sheet type has been input.

The sheet type of the print sheet placed on the manual feed tray is input by the user.

In order for the user to enter the sheet type of the print sheet, for example, the user may display a list of available sheet types, select the sheet type of the print sheet placed by the user from the list, and enter the sheet type.

As described above, the sheet type is information related to the type of a print sheet such as plain paper, an OHP sheet, a glossy sheet, and the like.

In step S34, when the user selects and inputs the sheet type, the processing proceeds to step S35. If not, the processing returns to step S33.

In step S35, the input sheet type is stored. The information that the sheet type and the sheet are available is stored as the acquisition sheet information 52.

Thereafter, the processing from step S8 to step S22 is executed in the same manner as the processing of FIGS. 10 and 11.

That is, the prediction condition information 53 is checked, and the proposal processing corresponding to the stored information that the sheet type and the sheet are available is searched.

Here, the acquired acquisition sheet information 52 is compared with the condition related to the print sheet in the prediction condition information 53, and it is checked whether there is the prediction condition information 53 that can match with the acquisition sheet information 52. When there is the prediction condition information 53 that can be matched, the proposal processing associated with the prediction condition information 53 is acquired.

When there is the prediction condition information that can match with the acquisition sheet information 52 in the prediction condition information 53, that is, when there is the proposal processing corresponding to the acquisition sheet information 52, the proposal processing is acquired, and stored as the acquisition proposal processing information 54.

Thereafter, the proposal display information 55 is generated by using the acquisition proposal processing information 54, and the display 13 displays the acquired proposal processing.

Further, it is checked whether the user has input, and when the user has input to approve the displayed proposal processing, the proposal processing is executed.

Alternatively, in case that a plurality of proposal processing are displayed, when the user has selected and input for approving any proposal processing, the selected proposal processing is executed.

On the other hand, when the user has input to reject the displayed proposal processing, the processing returns to step S31.

In returning to step S31, it is preferable to delete the function proposal screen.

As described above, in case that the user operates to place a print sheet on the manual feed tray and inputs the sheet type of the print sheet, when the proposal processing corresponding to the information related to the print sheet acquired based on the operation executed by the user (acquisition sheet information 52) is stored in the prediction condition information 53, the proposal processing is displayed.

In this case as well, as in the first embodiment described above, it is possible to reduce the operational burden on the user, and shorten the time period required to actually execute the proposal processing after the print sheet is placed.

Third Embodiment: Prediction Proposal Processing when Document and Print Sheet are Detected In the third embodiment, a description will be given of prediction proposal processing in which, when the user places a document and a print sheet, the processing predictor 26 acquires the proposal processing associated in advance with the placed document and the placed print sheet, the proposal processing generator 27 generates information related to the acquired proposal processing, and presents the proposal processing to the user.

Figure 13:
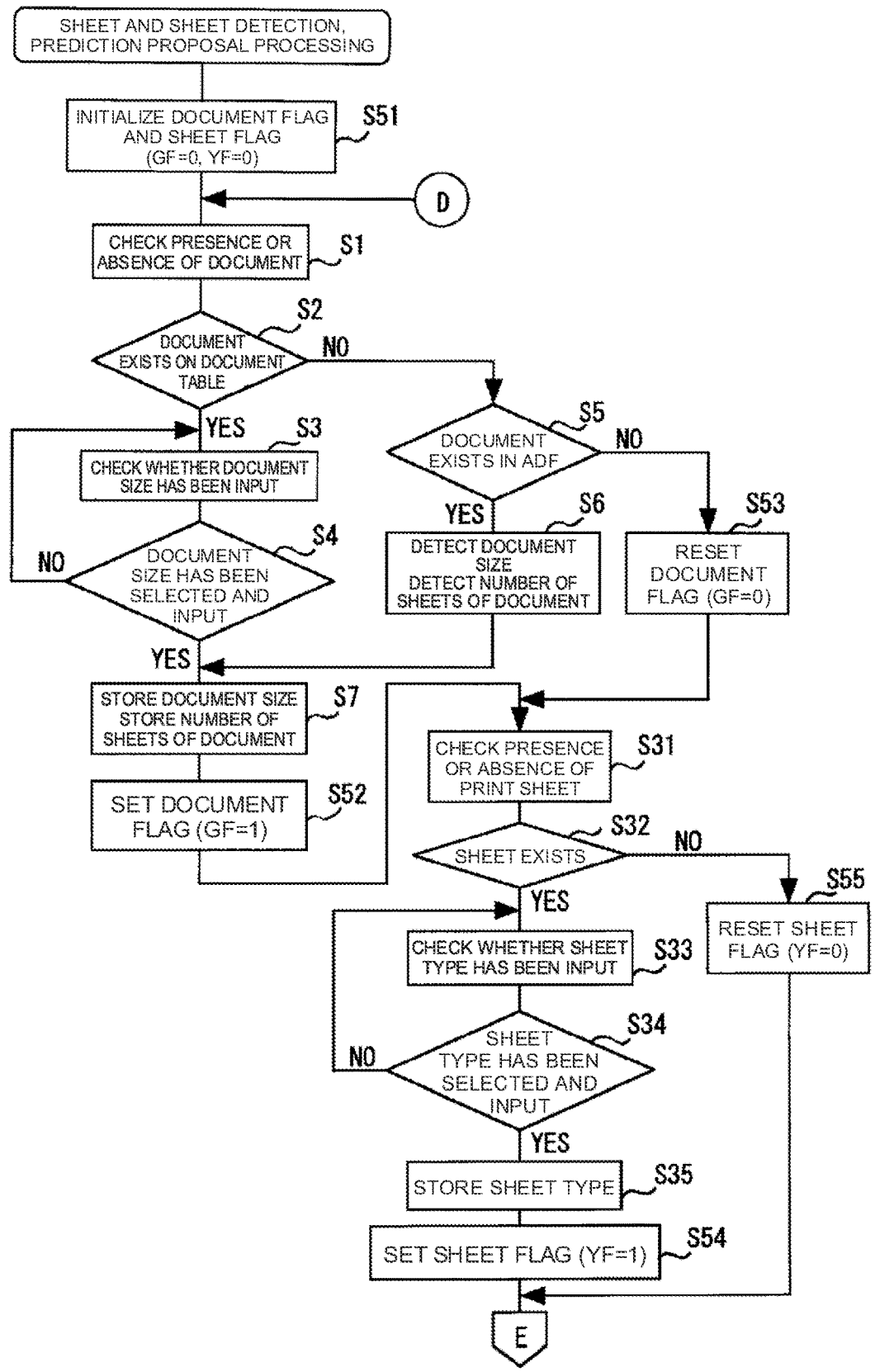
FIG. 13 is a flowchart illustrating an embodiment of prediction proposal processing that displays proposal processing to a user when a document and a print sheet are detected according to the present invention.
Figure 14:
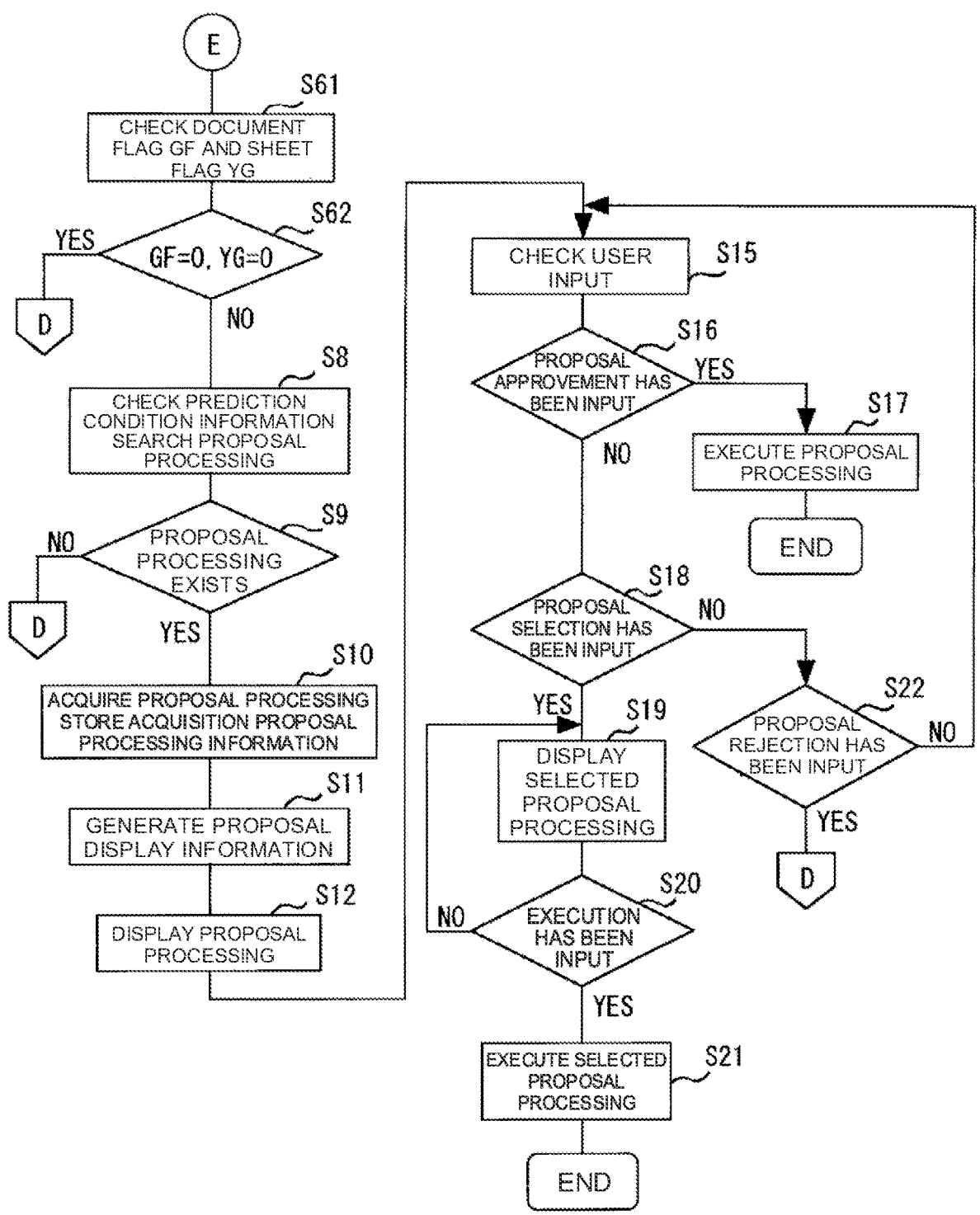
FIG. 14 is a flowchart illustrating an embodiment of the prediction proposal processing that displays the proposal processing to the user when a document and a print sheet are detected according to the present invention.

FIGS. 13 and 14 illustrate a flowchart of an embodiment of the prediction proposal processing for displaying the proposal processing to the user when a document and a print sheet are detected.

Here, the processing predictor 26 acquires information for a document placed on the document table 41 or in the ADF 42, and information for a print sheet placed on the manual feed tray, and performs the prediction proposal processing.

The same numbers are assigned to the steps that perform the same processing as the steps illustrated in FIGS. 10, 11, and 12 described above.

Further, a document flag GF and a sheet flag YF are used to manage the presence or absence of a document and the presence or absence of a print sheet.

The document flag GF is information for managing the presence or absence of a document.

For example, the state of GF=0 means that there is no document, and indicates a state in which no document is placed either on the document table 41 or in the ADF 42.

The state of GF=1 means that there is a document, and indicates a state that the document is placed on the document table 41 or in the ADF 42.

The sheet flag YF is information for managing the presence or absence of a print sheet.

For example, the state of YF=0 means that there is no print sheet on the manual feed tray, and indicates a state in which there is no print sheet on the manual feed tray.

The state of YF=1 means that there is a print sheet on the manual feed tray, and indicates a state in which the print sheet is placed on the manual feed tray.

In step S51 in FIG. 13, the document flag GF, and the sheet flag YF are initialized. That is, the document flag GF and the sheet flag YF are set so as to indicate the state in which there is neither a document nor a print sheet (GF=0, YF=0).

Thereafter, the processing from step S1 to step S7 illustrated in FIG. 10 is executed. That is, when there is a document on the document table 41 or in the ADF 42 based on checking the existence of the document, the size and the number of sheets of the document are stored.

In this case, in step S52, the document flag GF is set to indicate that there is a document (GF=1), and the processing proceeds to step S31.

On the other hand, when there is no document on the document table 41 and in the ADF 42, the processing proceeds to step S53, the document flag GF is reset (GF=0), and the processing proceeds to step S31.

Thereafter, the processing from steps S31 to S35 is executed in the same manner as in FIG. 12.

That is, it is checked whether there is a print sheet on the manual feed tray, and when there is a print sheet on the manual feed tray and the sheet type is also input, the sheet type is stored. In this case, in step S54, the sheet flag YF is set to indicate that there is a sheet (YF=1), and the processing proceeds to step S61 in FIG. 14.

On the other hand, when there is no print sheet on the manual feed tray, the sheet flag YF is reset (YF=0) in step S55, and the processing proceeds to step S61 in FIG. 14.

In the processing so far, the presence or absence of a document and the presence or absence of a print sheet are checked, and the state indicating the presence or absence of a document and the presence or absence of a print sheet are set to the document flag GF and the sheet flag YF.

In step S61 in FIG. 14, the document flag GF, and the sheet flag YF are checked.

In step S62, when GF=0 and YF=0, that is, when there is no document or print sheet, the processing returns to step S1 in FIG. 13. Otherwise, the processing proceeds to step S8.

Thereafter, the processing from steps S9 to S12 is executed as in FIG. 10, and the processing from steps S15 to S22 is executed as in FIG. 11.

Here, the proposal processing generator 27 checks the prediction condition information 53 by using the acquisition document information 51 and the acquisition sheet information 52 acquired in the above processing, acquires the proposal processing corresponding to the acquired document and print sheet related information (the document size, the sheet type, and the like), and displays the proposal processing on the display 13.

Further, when the user inputs to approve the displayed proposal processing, the proposal processing is executed.

When the user inputs to reject the proposal processing, the processing returns to step S1 in FIG. 13. In the case of returning to step S1, it is preferable to delete the function proposal screen.

As described above, in case that the user operates to place a document on the document table 41 or in the ADF 42, operates to place a print sheet on the manual feed tray, and inputs the sheet type of the print sheet, when the proposal processing corresponding to both the acquired document related information (acquisition document information 51) and the acquired print sheet related information (acquisition sheet information 52) based on the operation executed by the user is stored in the prediction condition information 53, the proposal processing is displayed.

As in the above-described embodiments, when the displayed proposal processing is the function that the user intends to execute, the user can immediately execute the proposal processing by inputting to select the displayed proposal processing. Therefore, it is possible to reduce the operational burden on the user, and shorten the time period required to actually execute the proposal processing after the document is placed.

Fourth Embodiment: Prediction Proposal Processing when Document and Print Sheet are Detected Here, a description will be given of an embodiment, which simultaneously displays predicted proposal processing, performs detection processing for a document, and performs detection processing for a print sheet in different tasks, and displays the proposal processing corresponding to the state of both the document and the print sheet, unlike the third embodiment.

Since the document detection processing and the print sheet detection processing are performed by different tasks, it is possible to display the proposal processing corresponding to both states every time the state of either the document detection or the print sheet detection changes.

Figure 15:
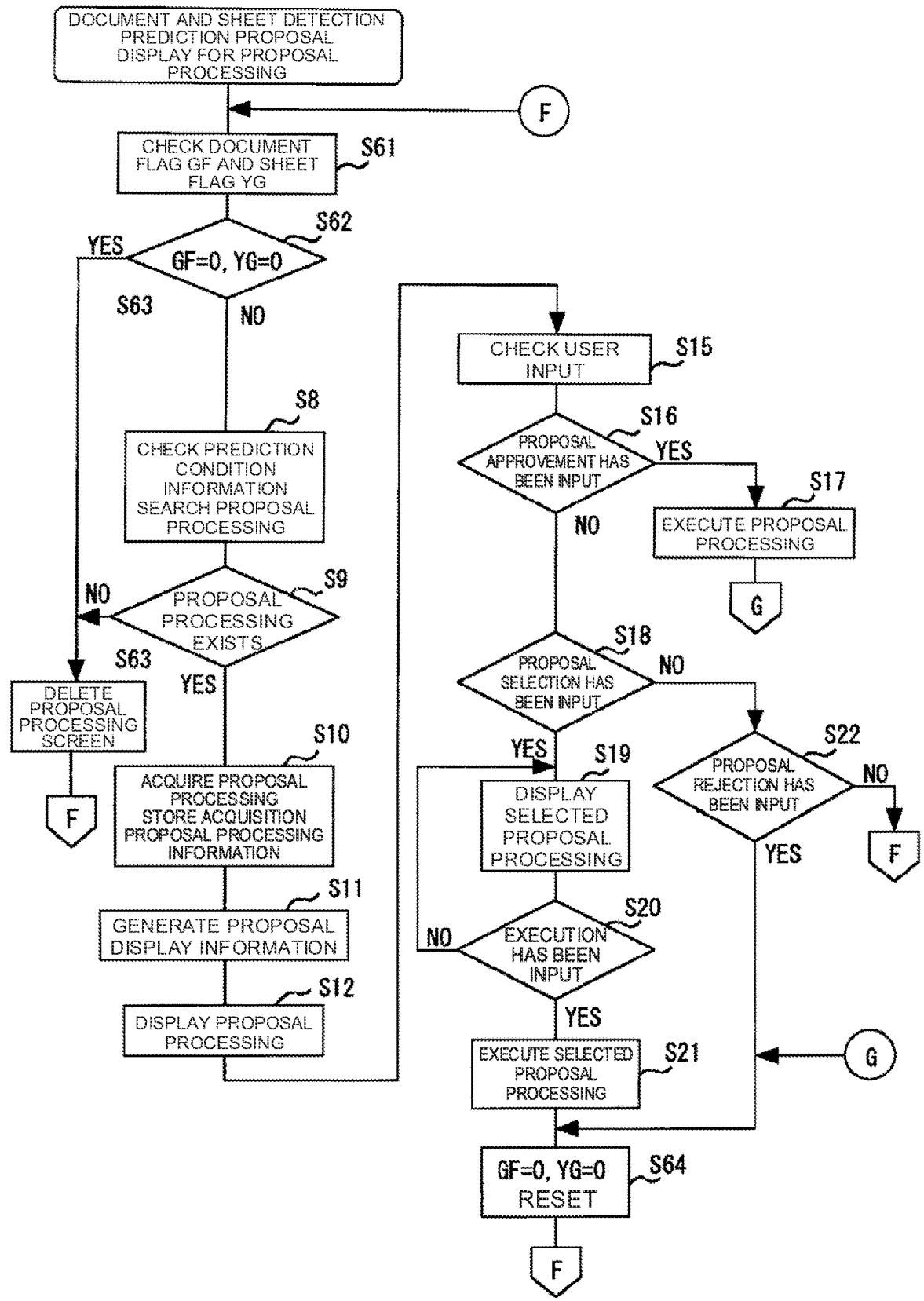
FIG. 15 is a flowchart illustrating an embodiment of prediction proposal processing when proposal processing is displayed to a user based on the detection state of a document and a print sheet according to the present invention.
Figure 16:
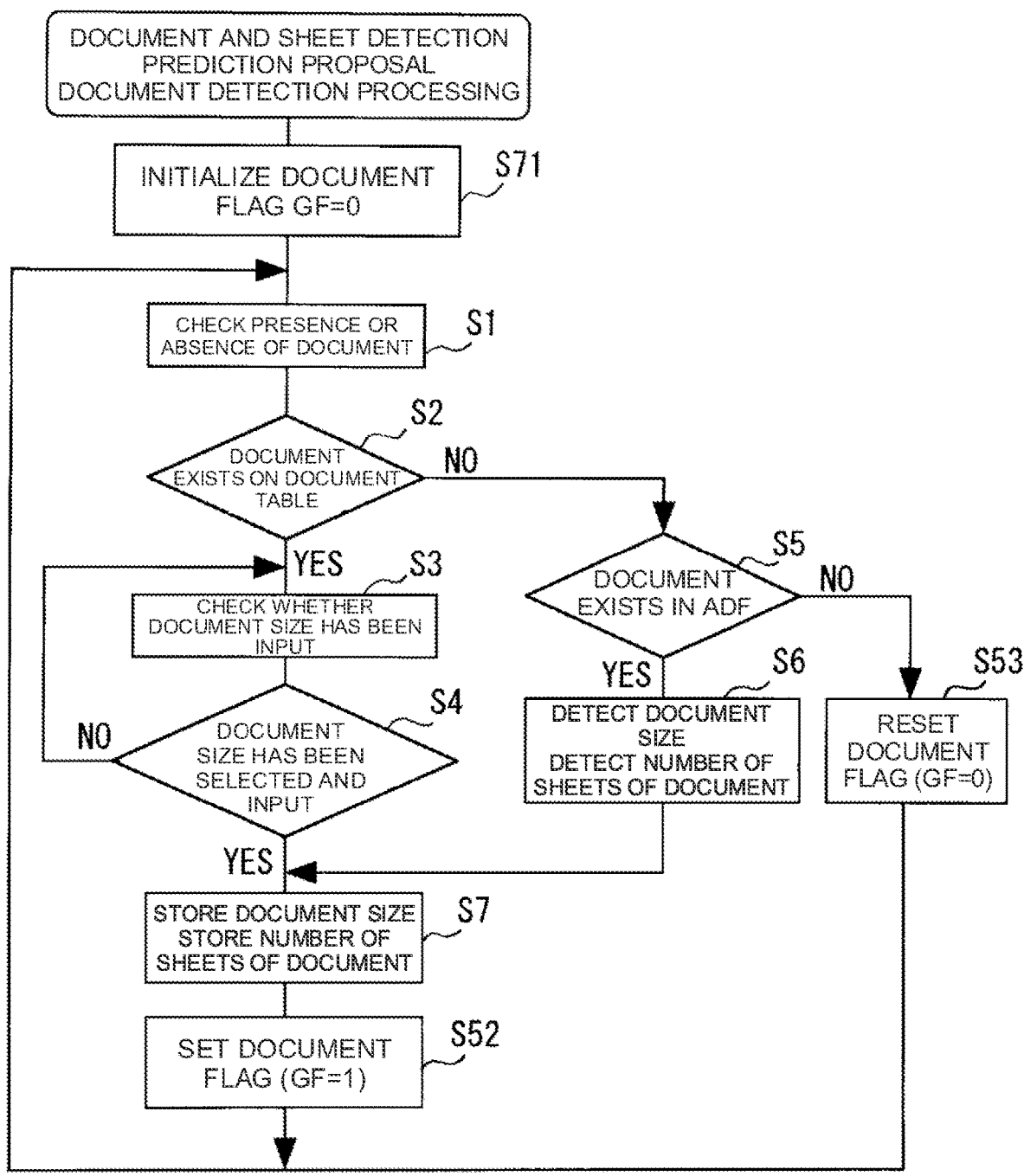
FIG. 16 is a flowchart illustrating of an embodiment of document detection processing when proposal processing is displayed to a user based on the detection state of a document and a print sheet according to the present invention.
Figure 17:
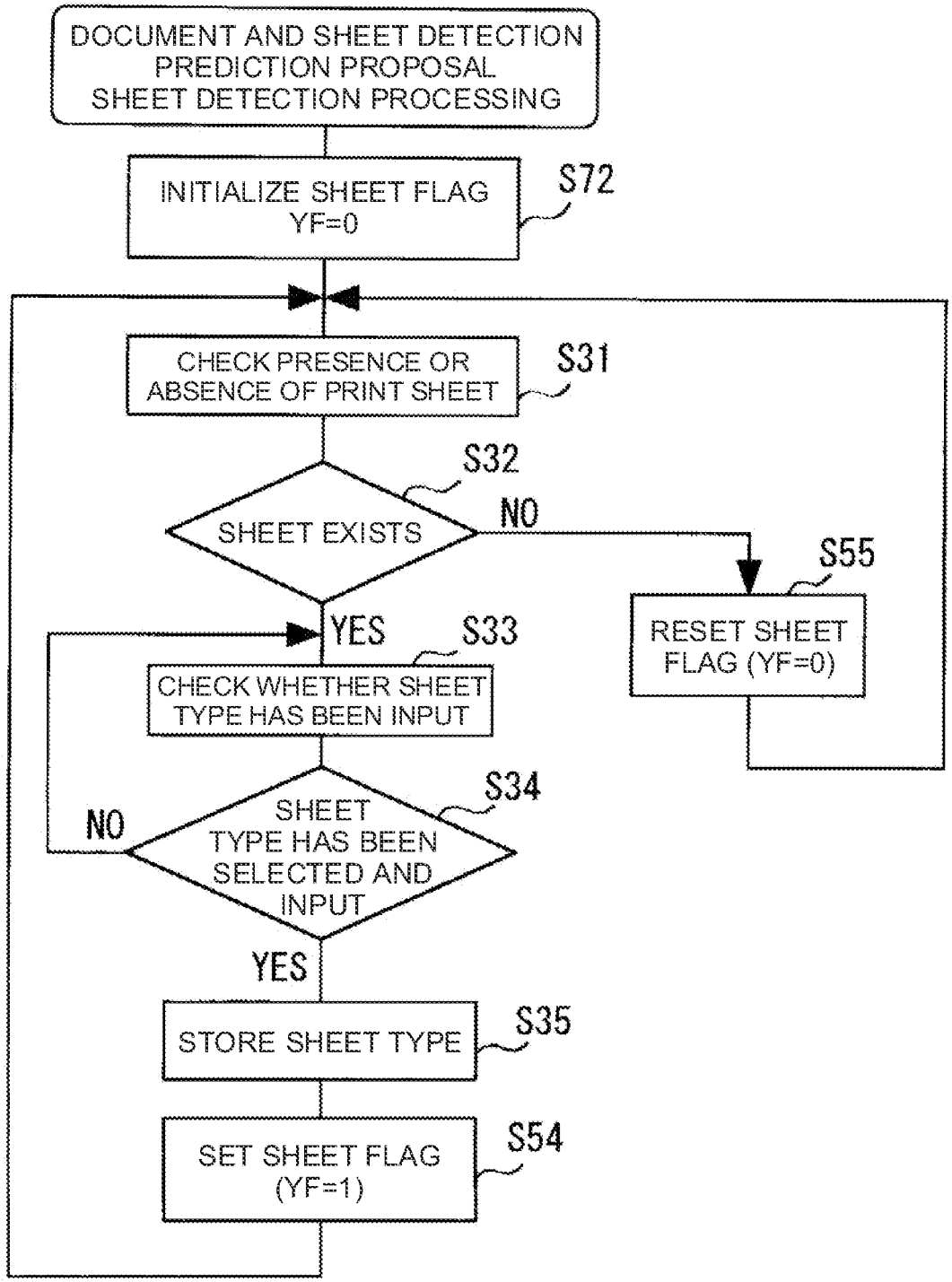
FIG. 17 is a flowchart illustrating an embodiment of sheet detection processing when proposal processing is displayed to a user based on the detection state of a document and a print sheet according to the present invention.

It is assumed that each processing for the flowcharts in FIGS. 15, 16 and 17 illustrated below is executed by multitasking.

The same numbers are assigned to the steps that perform the same processing as the steps illustrated in FIGS. 10 to 14 described above.

FIG. 15 illustrates a flowchart of an embodiment of the prediction proposal processing when the proposal processing is displayed to the user based on the detection state of a document and a print sheet.

The processing illustrated in FIG. 15 is substantially the same as the processing illustrated in FIG. 14, and FIG. 15 illustrates a flowchart for mainly executing the processing related to the acquisition of the proposal processing and the execution of the proposal processing.

In step S61 in FIG. 15, the document flag GF, and the sheet flag YF are checked. When GF=0 and YF=0 in step S62, that is, when there is no document or print sheet, the processing proceeds to step S63. In step S63, when the function proposal screen including the proposal processing is currently displayed, the function proposal screen is deleted, and the processing returns to step S61 in FIG. 15.

On the other hand, in step S62, when GF=0 and YF=0, the processing proceeds to step S8.

Thereafter, the processing from step S8 to step S12 and the processing from step S15 to step S22 are the same as the above processing, and thus the detailed description thereof will be omitted.

Note that when there is no proposal processing in step S9, the function proposal screen including the proposal processing is currently displayed, the function proposal screen is deleted, and the processing returns to step S61 in FIG. 15.

Further, in case that the proposal processing is executed in step S17, when the proposal processing is completed, the processing proceeds to step S64, the document flag GF and the sheet flag YF are reset (GF=0, YF=0), and the processing proceeds to the step S61 in FIG. 15.

Furthermore, when the selection proposal processing is executed in step 21, or when there is an input that rejects the proposal processing in step S22, in step S64, the document flag GF and the sheet flag YF are reset (GF=0. YF=0), and the processing returns to step S61 in FIG. 15.

Note that, in step S22, when there is no input that rejects the proposal processing, it is determined that the content input by the user is an input unrelated to the proposal processing, and the processing corresponding to the input is executed in a task different from that in FIG. 15. Therefore, in the flowchart of FIG. 15, it is assumed that the processing returns to step S61 of FIG. 15.

FIG. 16 illustrates a flowchart of an embodiment of the document detection processing when the proposal processing is displayed to the user based on the detection state of a document and a print sheet.

The processing illustrated in FIG. 16 is the same processing as a part of the processing illustrated in FIGS. 10 and 13, and FIG. 16 illustrates a flowchart mainly for performing the processing related to the check of the presence or absence of a document and the detection and storage of the document size.

Here, the document flag GF is initialized (GF=0). Then, when there is a document, the document flag GF is set (GF=1). When there is no document, the document flag GF is reset (GF=0).

In step S71 in FIG. 16, the document flag GF is initialized (GF=0).

In step S1, the presence or absence of a document is checked.

Here, although not illustrated here, the presence or absence of a document may be checked every time a preset fixed time has elapsed.

Thereafter, the processing from step S2 to step S7 described above is performed.

When a document is placed on the document table 41 or in the ADF 42, the document flag GF is set (GF=1) in step S52, and the processing returns to step S1.

On the other hand, when no document is not placed either on the document table 41 or in the ADF 42, the document flag GF is reset (GF=0) in step S53, and the processing returns to step S1.

FIG. 17 illustrates a flowchart of an embodiment of the sheet detection processing when the proposal processing is displayed to the user based on the detection state of a document and a print sheet.

The processing illustrated in FIG. 17 is the same as a part of the processing illustrated in FIGS. 12 and 13, and FIG. 17 illustrates a flowchart mainly for performing the processing related to the check of the presence or absence of a print sheet on the manual feed tray, and the input check and storage of the sheet type.

Here, the sheet flag YF is initialized (YF=0). Then, when there is a print sheet, the sheet flag YF is set (YF=1). When there is no print sheet, the sheet flag YF is reset (YF=0).

In step S72 in FIG. 17, the sheet flag YF is initialized (YF=0).

In step S31, the presence or absence of a print sheet is checked.

Here, although not illustrated, the presence or absence of a print sheet may be checked every time a preset fixed time has elapsed.

Thereafter, the processing from step S32 to step S35 described above is performed.

When a print sheet is placed on the manual feed tray, the sheet flag YF is set (YF=1) in step S54, and the processing returns to step S31.

On the other hand, when no print sheet is placed on the manual feed tray, the sheet flag YF is reset (YF=0) in step S55, and the processing returns to step S31.

As described above, even when the processing of displaying the proposal processing, the document detection processing, and the sheet detection processing are independently operated by different tasks, similar to the third embodiment, when the proposal processing corresponding to both of document related information (acquisition document information 51) and print sheet related information (acquisition sheet information 52), which are acquired based on the user's operations for placing a document and a print sheet, is stored in the prediction condition information 53, the proposal processing is displayed.

Further, similarly, when the displayed proposal processing is the function that the user intends to execute, the user can immediately execute the proposal processing by inputting to select the displayed proposal processing. Therefore, it is possible to reduce the operational burden on the user, and to shorten the time period required to actually execute the proposal processing after the document is placed.

What is claimed is:

1. An image forming device comprising:
a document information acquirer that acquires information related to a document placed at a predetermined document placement position;
a sheet information acquirer that acquires information related to a print sheet placed at a predetermined position;
a storage that stores, in advance, information related to the document, information related to the print sheet, and prediction condition information comprising proposal processing associated with a document and a print sheet;
a processing predictor that compares the prediction condition information with the acquired information related to the document and the acquired information related to the print sheet, predicts a function to be executed by a user, and confirms whether or not there is a process that can be presented to the user, wherein when there is the process that can be presented to the user, the processing predictor acquires the proposal processing associated with the document and the print sheet, which are placed; and
a proposal processing generator that generates information related to the proposal processing to be presented to a user based on the obtained proposal processing,
wherein when a user places a document and a print sheet, the processing predictor acquires proposal processing associated in advance with the placed document and the placed print sheet, and the proposal processing generator generates information related to the obtained proposal processing, and presents proposal processing to a user.

2. The image forming device according to claim 1, the image forming device further comprising a display,
wherein proposal processing is presented to a user by displaying information related to the generated proposal processing on the display.

3. The image forming device according to claim 1,
wherein the document placement position is a position at which a document is placed on a document table or in an automatic document feeder, and
wherein information related to a document acquired by the document information acquirer comprises the presence or absence of a document placed on the document table or in the automatic document feeder, and a document size.

4. The image forming device according to claim 1,
wherein a position where the print sheet is placed is a manual feed tray, and
wherein information related to a print sheet acquired by the sheet information acquirer comprises the presence or absence of a print sheet placed on the manual feed tray and a sheet type.

5. The image forming device according to claim 1,
wherein the prediction condition information stores in advance:
information related to a document, which comprises the presence or absence of a document placed on a document table, the presence or absence of a document placed in an automatic document feeder, and a size of a document to be placed;
information related to a print sheet, which comprises the presence or absence of a print sheet placed on a manual feed tray and a sheet type of a print sheet; and
a plurality of prediction information associated with proposal processing that is predicted to be executed by a user.

6. The image forming device according to claim 1, the image forming device further comprising:
an operator; and
a function executor that executes the presented proposal processing,
wherein, when the operator receives an input for approving as a function for next executing the presented proposal processing, and
wherein the function executor causes the presented proposal processing to be performed.

7. A proposal processing prediction method for an image forming device, the method comprising:
acquiring information related to a document placed at a predetermined document placement position as acquisition of document information;
acquiring information related to a print sheet placed at a predetermined position as acquisition of sheet information;
comparing the prediction condition information with the acquired information related to the document and the acquired information related to the print sheet, predicting a function to be executed by a user, and confirming whether or not there is a process that can be presented to the user, wherein when there is the process that can be presented to the user, acquiring the proposal processing associated with the document and the print sheet, which are placed, as a prediction of processing;
generating, based on the acquired proposal processing, information related to the proposal processing to be presented to a user, as generation of proposal processing; and
displaying information related to the generated proposal processing,
wherein when a user places a document and a print sheet, the proposal processing is presented to a user as a function that a user intends to execute before a user executes a desired function.

* * * * *